(12) United States Patent
Kiyama et al.

(10) Patent No.: US 7,922,480 B2
(45) Date of Patent: Apr. 12, 2011

(54) COMBUSTION APPARATUS AND WIND BOX

(75) Inventors: Kenji Kiyama, Kure (JP); Shigeki Morita, Kure (JP); Osamu Okada, Kure (JP); Koji Kuramashi, Kure (JP); Takanori Yano, Kure (JP); Kenichi Ochi, Kure (JP); Akira Baba, Kure (JP); Miki Shimogori, Kure (JP); Takeru Fukuchi, Kure (JP); Hiroshi Yamaguchi, Kure (JP); Hironobu Kobayashi, Hitachi (JP); Masayuki Taniguchi, Hitachi (JP); Hirofumi Okazaki, Hitachi (JP); Kenji Yamamoto, Hitachi (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 675 days.

(21) Appl. No.: 10/538,524

(22) PCT Filed: Aug. 27, 2003

(86) PCT No.: PCT/JP03/10840
§ 371 (c)(1),
(2), (4) Date: Jun. 10, 2005

(87) PCT Pub. No.: WO2004/053392
PCT Pub. Date: Jun. 24, 2004

(65) Prior Publication Data
US 2006/0115780 A1 Jun. 1, 2006

(30) Foreign Application Priority Data
Dec. 12, 2002 (JP) .................... 2002-361093

(51) Int. Cl.
*F23M 9/00* (2006.01)
(52) U.S. Cl. .............. 431/10; 431/5; 431/182; 431/185; 431/173

(58) Field of Classification Search .................. 431/2, 5, 431/10, 115–116, 162–190; 110/263–265, 110/347, 203–207, 261, 345, 348
See application file for complete search history.

(56) References Cited

U.S. PATENT DOCUMENTS
4,135,874 A * 1/1979 Tsuzi et al. .................... 431/115
(Continued)

FOREIGN PATENT DOCUMENTS
DE 197 05 938 A1 8/1998
(Continued)

OTHER PUBLICATIONS
EP Search Report dated Oct. 20, 2010 in English.

*Primary Examiner* — Alfred Basichas
(74) *Attorney, Agent, or Firm* — Antonelli, Terry, Stout & Kraus, LLP.

(57) ABSTRACT

The invention provides a combustion apparatus which can inhibit an NOx generation even in the case of promoting a mixing between a high-temperature combustion gas and an air so as to intend to reduce an unburned combustible. In a combustion apparatus provided with a burner burning a fuel within a furnace in a theoretical air ratio or less, and an air port supplying a combustion air for a shortfall in the burner, a supply apparatus for supplying a nitrogen oxide generation inhibiting gas is provided in a mixing region between the both or near the mixing region. Further, the invention provides a wind box which can inhibit an NOx generation even in the case of promoting a mixing between a high-temperature combustion gas and an air so as to intend to reduce an unburned combustible. In a wind box having an air port arranged in a back flow side of the burner and supplying a combustion air for a shortfall in the burner, a supply apparatus for supplying a nitrogen oxide generation inhibiting gas is provided in a mixing region between the both or near the mixing region.

10 Claims, 22 Drawing Sheets

U.S. PATENT DOCUMENTS

| | | | | |
|---|---|---|---|---|
| 4,545,307 A | * | 10/1985 | Morita et al. | 110/264 |
| 5,231,937 A | * | 8/1993 | Kobayashi et al. | 110/262 |
| 5,662,464 A | * | 9/1997 | LaRose et al. | 431/8 |
| 5,727,480 A | * | 3/1998 | Garcia-Mallol | 110/203 |
| 5,915,310 A | * | 6/1999 | Hura et al. | 110/345 |
| 6,145,454 A | * | 11/2000 | Barna | 110/347 |
| 6,280,695 B1 | * | 8/2001 | Lissianski et al. | 423/239.1 |
| 6,357,367 B1 | * | 3/2002 | Breen et al. | 110/345 |
| 2002/0064742 A1 | * | 5/2002 | Ligasacchi et al. | 431/190 |
| 2003/0099913 A1 | * | 5/2003 | Kobayashi et al. | 431/10 |
| 2006/0090677 A1 | * | 5/2006 | Taniguchi et al. | 110/265 |
| 2006/0115779 A1 | * | 6/2006 | Yamamoto et al. | 431/115 |

FOREIGN PATENT DOCUMENTS

| | | |
|---|---|---|
| JP | 50-4626 | 1/1975 |
| JP | 54-35419 | 3/1979 |
| JP | 54-100536 | 8/1979 |
| JP | 56-058110 | 5/1981 |
| JP | 58-033019 | 2/1983 |
| JP | 59-60106 | 4/1984 |
| JP | 59-74408 | 4/1984 |
| JP | 59-109714 | 6/1984 |
| JP | 59-157406 | 9/1984 |
| JP | 59-191807 | 10/1984 |
| JP | 59-195016 | 11/1984 |
| JP | 62-138607 | 6/1987 |
| JP | 62-237219 | 10/1987 |
| JP | 62-276322 | 12/1987 |
| JP | 1-26444 | 5/1989 |
| JP | 1-101011 | 7/1989 |
| JP | 3-286906 | 12/1991 |
| JP | 9-229311 | 9/1997 |
| JP | 9-296927 | 11/1997 |

* cited by examiner

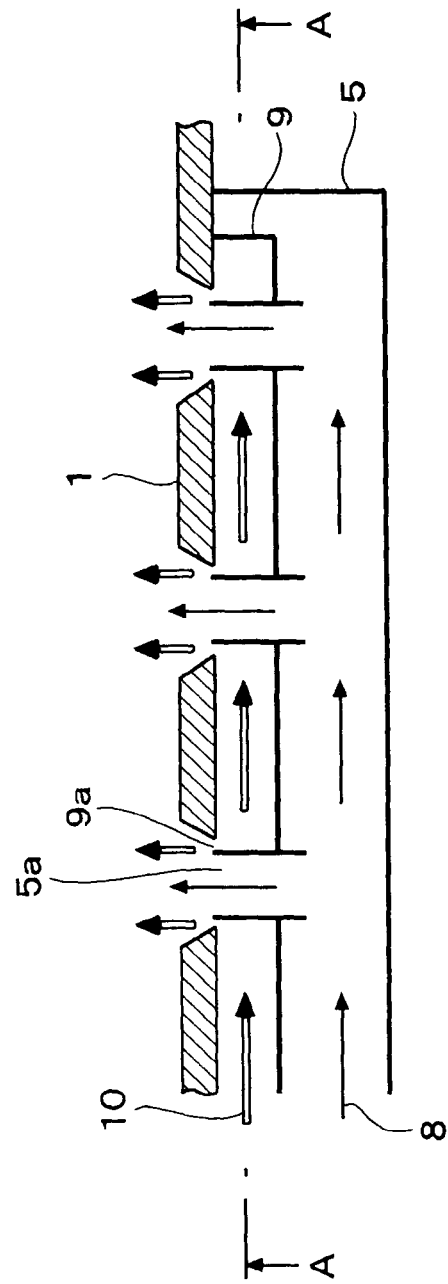
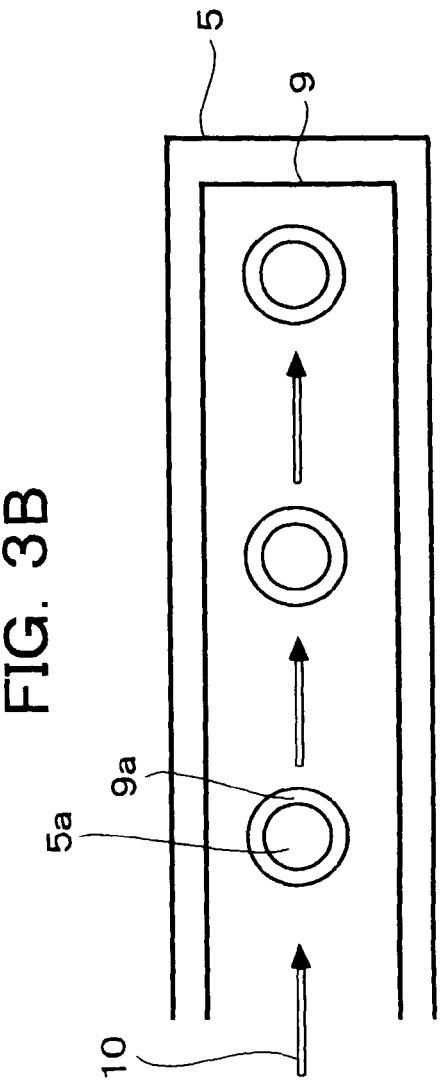

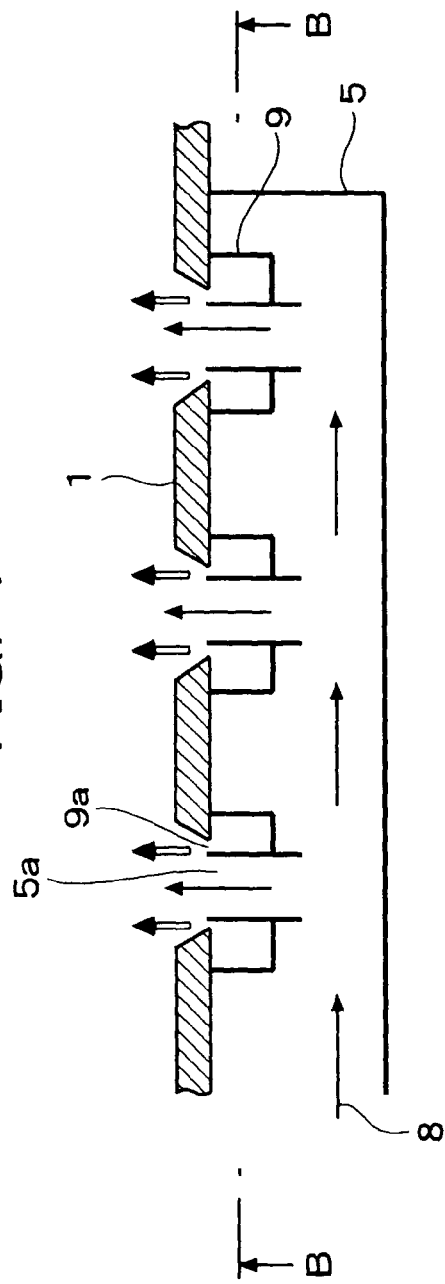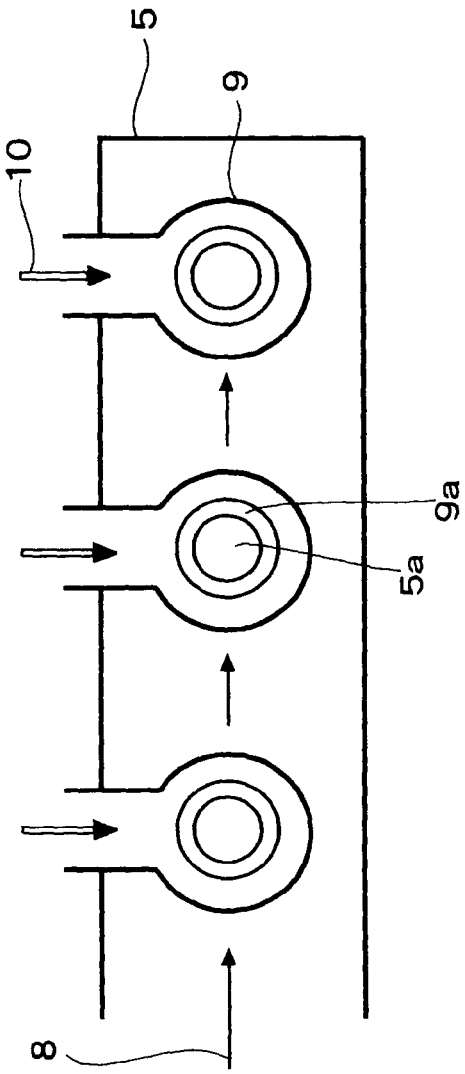

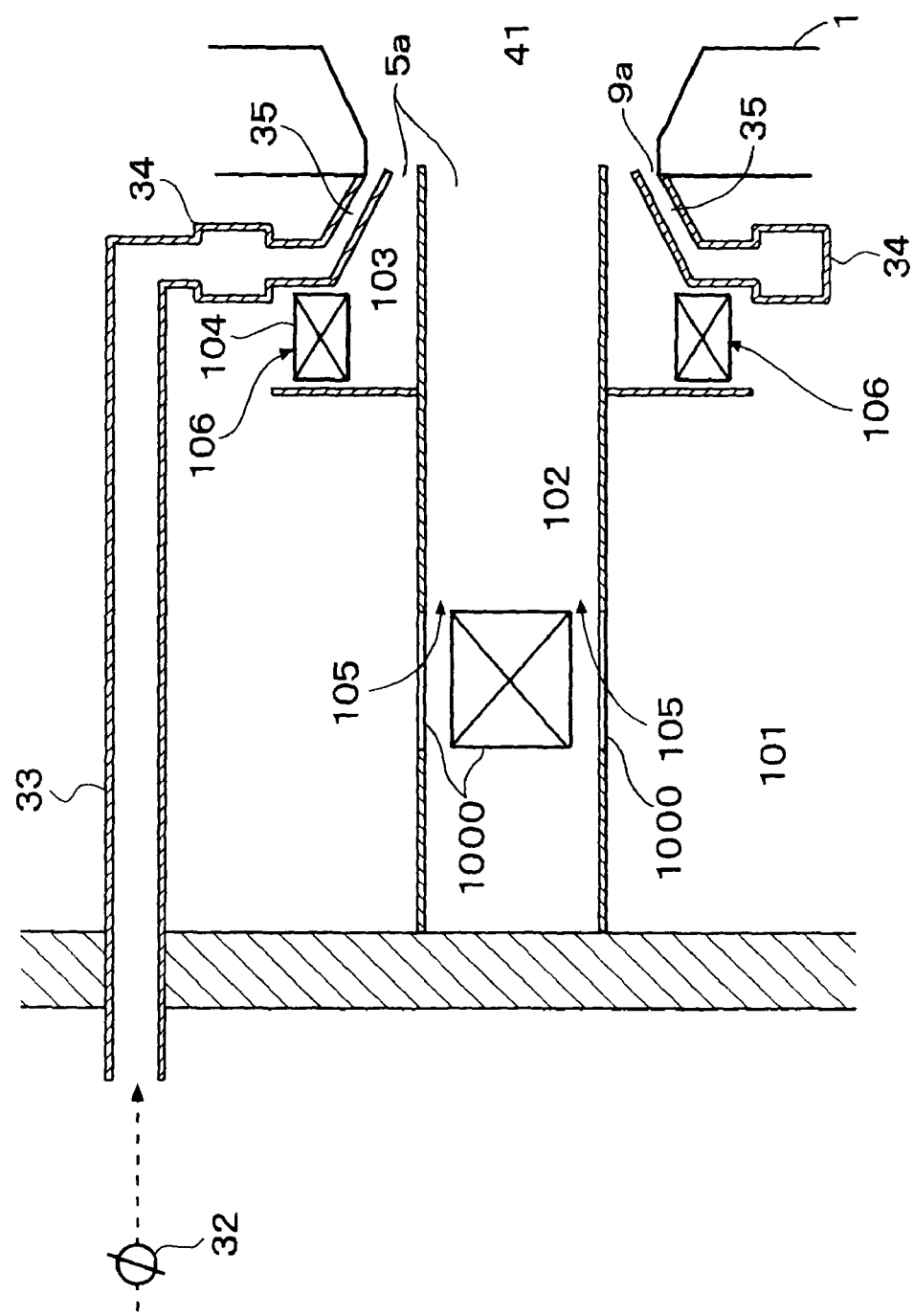

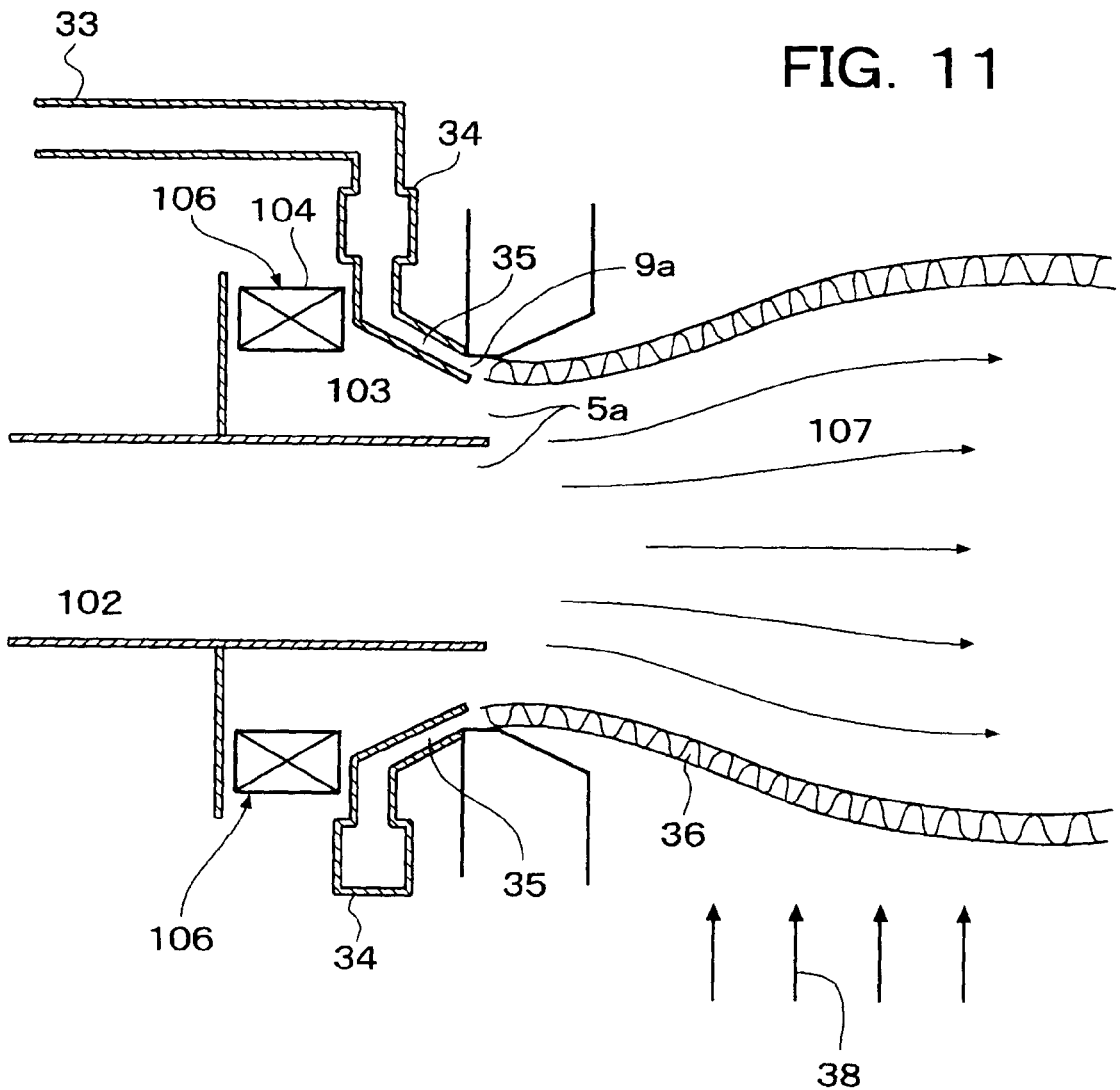

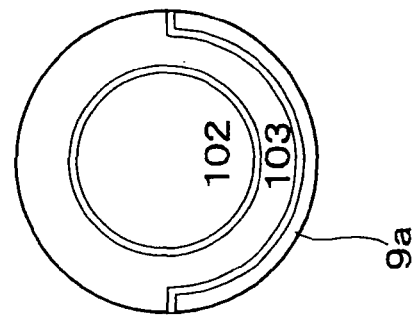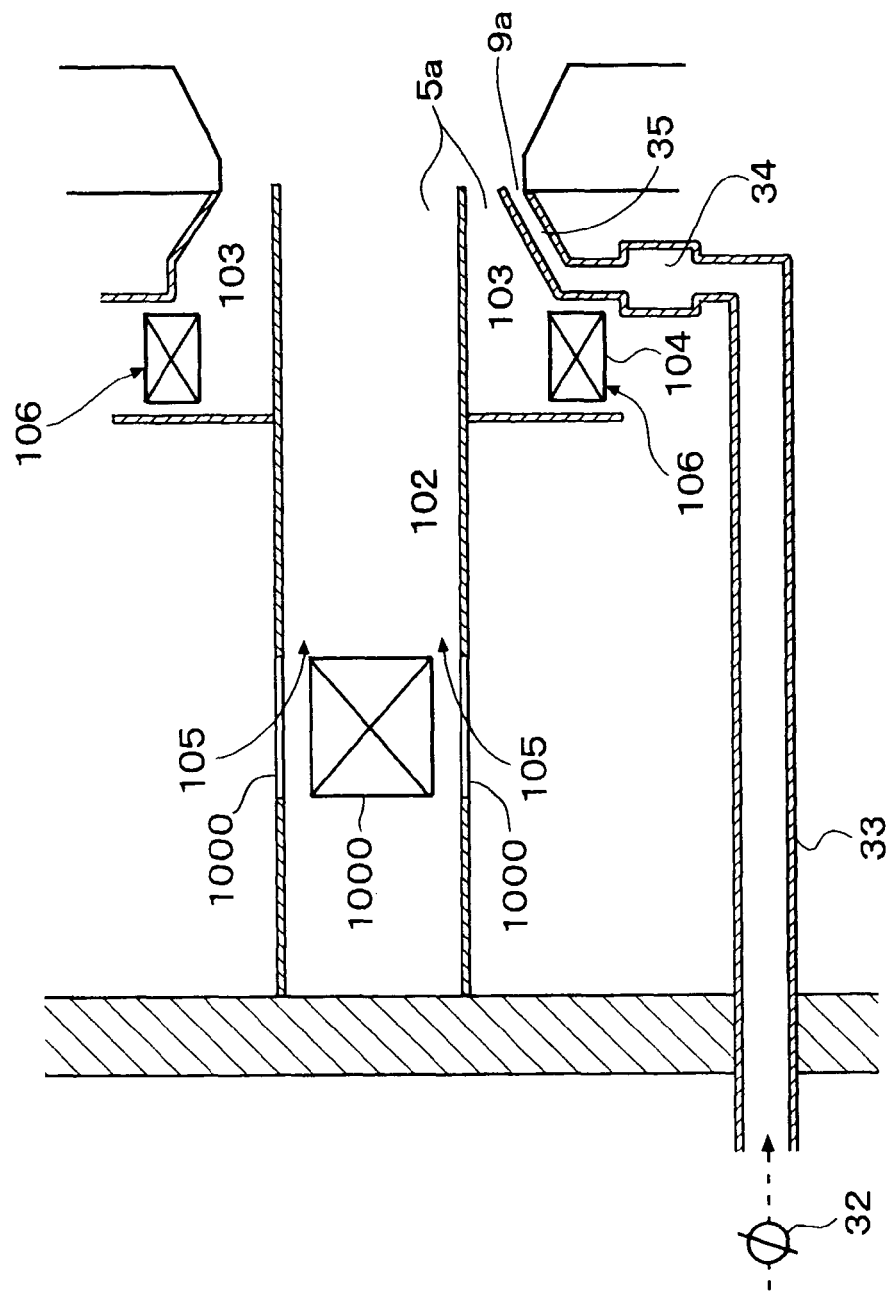

COMBUSTION APPARATUS AND WIND BOX

TECHNICAL FIELD

The present invention relates to a combustion apparatus such as a commercial boiler, an industrial boiler or the like, and more particularly to a combustion apparatus which has a reduced amount of unburned combustible, can execute a high-efficiency combustion, and can inhibit a nitrogen oxide (NOx) from being generated within a furnace.

BACKGROUND ART

At present, in order to remove the nitrogen oxide (NOx) contained in a combustion gas generated by a combustion of a fuel such as a coal or the like within a furnace of the industrial boiler for a power generation or the like, an NOx removal apparatus is provided in a back flow side of an exhaust gas flow path in which a combustion gas (hereinafter, refer to as an exhaust gas) discharged from the furnace is circulated. However, on the other hand, in order to save an operating cost required for a consumption of an ammonia in the NOx removal apparatus, the structure is made such that an amount of NOx generated within the furnace is reduced as little as possible by executing a low NOx combustion in a combustion stage within the furnace.

A method of the low NOx combustion includes a two-stage combustion method of divisionally supplying an air required for the fuel combustion (hereinafter, refer to as a combustion air) in an entire within the furnace, and a method using a low NOx burner having a low NOx function as a burner, and a low NOx combustion using them together is generally executed.

FIG. 20A is a schematic front elevational view showing an example of a structure of a combustion apparatus such as a boiler or the like, and FIG. 20B is a schematic side elevational view of the combustion apparatus. Three stages of burners 2 and one stage of air port (hereinafter, refer to as an after air port (AAP) because the air port exists in a back flow side of a gas flow as seen from the burner) are attached in the furnace defined and formed by a water wall 1 so as to face to each other in four rows. In order to supply the combustion air to each of the burners 2 and the AAP 3, a wind box 4 for burner and a wind box 5 for AAP are respectively placed. The burner 2 executes a combustion in which an air ratio (air amount supplied to the burner/theoretical amount of air) is about 0.8. In other words, the NOx generation can be lowered by executing the combustion in which the air is slightly short in comparison with the air amount (the theoretical air amount theoretically required for a complete combustion of the fuel). However, since a rate of the unburned fuel (hereinafter, refer to as an unburned combustible) is inversely increased, the complete combustion is executed by injecting a shortfall air by the AAP 3 in the back flow side.

As mentioned above, the two-stage combustion method is an effective method for reducing the generating amount of the NOx. In this case, in the low NOx burner, a burner structure is contrived such that a denitration can be executed within a flame formed by the burner, however, a detailed description will be omitted here.

A conventional AAP structure is shown in FIG. 21. A high-temperature combustion air (hereinafter, refer to as a high-temperature air) 8 is supplied to the AAP wind box 5 of the AAP 3 attached to a gas flow downstream side of the burner 2 of the water wall 1 (an upper side of the burner 2), and the high-temperature air is supplied into the high-temperature combustion gas within the furnace so as to form a jet flow. In this case, the combustion air 8 is supplied to the burner and the AAP after a temperature of the combustion air 8 is increased to about 300° C. for improving a power generating efficiency of a plant, generally by maintaining the temperature of the high-temperature combustion gas within the furnace.

A combustion region moves into a downstream side of the furnace at a time of employing the two-stage combustion method. Accordingly, if the mixing of the high-temperature combustion gas within the furnace with the high-temperature air flow from the AAP 3 is bad, the high-temperature combustion gas is discharged from the furnace in a state in which the high-temperature combustion gas and the high-temperature air 8 are not sufficiently mixed. Therefore, a lot of unburned combustible (an unburned carbon in a coal and a carbon monoxide in the combustion gas) are contained in the exhaust gas from the furnace. Accordingly, in the furnace of the commercial boiler which has a great combustion efficiency and has an influence on an economical efficiency, in order to promote the mixing of the air from the AAP3, an AAP having a structure shown in FIG. 22 is employed (refer to patent document 1 (JP-A-59-109714)). In this structure, the mixing with the high-temperature combustion gas is promoted by the high-temperature air flow which is supplied from a swiveling device 6 and is swiveled. At the same time, it is possible to supply the high-temperature air flow to a center portion of the furnace by injecting a straight flow having a flow amount controlled by a damper 7 to a center portion of the swirling flow so as to secure a spray penetration of the jet flow.

FIG. 23 is a schematic view of an outline structure of a combustion apparatus, for example, disclosed in patent document 2 (JP-A-3-286906) and patent document 3 (JP-U-1-101011). A burner 2, a lower stage port 11 and an upper stage port 12 are placed in a water wall 1. In other words, the AAP is provided so as to be separated into two upper and lower stages. An exhaust gas or a low-temperature air 10 is supplied from the lower stage port 11, and the high-temperature air 8 is supplied from the upper stage port 12.

The burner 2 and the upper stage port 12 realize a normal two-stage combustion method. In this case, a high-temperature portion is formed in an upper portion of the burner within the furnace, and a gas temperature becomes too high by supplying the high-temperature air 8 and NOx tends to be generated. Accordingly, in order to temporarily lower the temperature of the gas within the furnace, the exhaust gas or the low-temperature air 10 is supplied from the lower stage port 11, and the NOx is prevented from being generated.

However, in this combustion apparatus, it is necessary to supply a lot of exhaust gas or low-temperature air 10 for lowering the temperature of the high-temperature combustion gas in the upper portion of the burner within the furnace. Accordingly, a power generation efficiency of the plant is significantly reduced.

FIG. 24 is a schematic view of an outline structure of a combustion apparatus in accordance with further the other prior art. As shown in the drawing, the burner 2 is arranged so as to face in three stages, and the AAP 3 is arranged so as to face in one stage. In the drawing, reference numeral 22 denotes an environmental apparatus such as an NOx removal apparatus or the like, reference numeral 23 denotes an opening and closing valve, reference numeral 24 denotes an air preheater, reference numeral 25 denotes a forced blower (FDF), reference numeral 26 denotes a coal pulverizing machine, reference numeral 27 denotes a chimney, reference numeral 28 denotes an exhaust gas recirculation blower (GRF), reference numeral 41 denotes a furnace, reference numeral 43 denotes a combustion air flow path, reference numeral 70 denotes an exhaust gas, reference numerals 71, 72 and 73 denote a heat exchanger tube, and reference numeral 74 denotes a furnace bottom gas supply chamber for supplying the exhaust gas to a bottom portion of the furnace.

A distribution within the furnace of an NOx concentration in the combustion apparatus having the structure is shown in FIG. 25. A horizontal axis in the drawing shows the NOx concentration, and a vertical axis shows a distance in a furnace height direction.

In the case that the flow amount of the air supplied from the burner in accordance with the two-state combustion is less than a theoretical air flow amount as shown in the drawing, the gas within the furnace until the air for the two-stage combustion is mixed is constituted by a reducing atmosphere, and the NOx generated in the burner region is gradually lowered. Since the atmosphere is changed to an oxidizing atmosphere by supplying the air for the two-stage combustion by the AAP, the amount of NOx is increased as shown by a solid line in the prior art. The increased NOx is constituted by two kinds NOx caused by the oxidization of the unburned nitrogen compound contained in the combustion gas, and caused by the oxidization of the nitrogen in the air under the high temperature (thermal NOx). In the pulverized coal firing, an NOx level is widely lowered on the basis of a high development of a low NOx combustion technique.

In conventional, a subject in which the NOx is reduced is mainly constituted by a fuel NOx originated from the nitrogen in the fuel, however, in recent days when the NOx level can be set to be equal to or less than 200 ppm, an existence of the thermal NOx is unable to disregard. As a result of a combustion simulation, it has been known that the thermal NOx comes to about one half of an entire NOx generation amount. Further, it has been known that most of the thermal NOx is generated after supplying the air for combustion (which may be called as an air for two-stage combustion) from the AAP. Further, it has been known that the unburned combustible existing in the high temperature portion in the upper portion of the burner becomes a high temperature locally in the early stage of the combustion caused by the air for two-stage combustion, and the thermal NOx is suddenly generated.

A description will be given in detail of the phenomenon with reference to FIG. 26. This drawing shows an AAP structure in accordance with the prior art provided in the water wall 1, and a mixed state of an injected air from the AAP and a high-temperature combustion gas within the furnace 41, and the AAP structure is of a type having two flow paths in the case of this example.

The air for two-stage combustion (an AAP primary air 105 and an AAP secondary air 106) is injected into the furnace 41 through an AAP primary air flow path 102 in a center side from a two-stage combustion air wind box 101, and an AAP secondary air flow path 103 in an outer peripheral side. A proper swivel is applied to the AAP secondary air 106 by an AAP secondary air register 104. In this case, reference numeral 1000 denotes an opening portion for introducing as an AAP primary electricity into the AAP primary air flow path 102 from the two-stage combustion air wind box 101.

In the sight of the combustion promotion for improving the power generating efficiency of the plant, the high-temperature air is frequently used for the air for two-stage combustion. In order to reduce the unburned combustible, it is necessary to promote the mixing of the air supplied from the AAP and the high-temperature combustion gas within the furnace. In order to promote the mixing, since it is necessary to make the air jet flow to reach the center portion of the furnace and to widen a width of the jet flow so as to prevent a gap from being generated between the jet flows, there are executed increasing a spray speed of the air jet flow so as to strengthen the spray penetration of the jet flow, applying the swivel to the air jet flow and the like. In each of the cases, an intensity of turbulence becomes large in the mixed region between the air and the high-temperature combustion gas. When the intensity of turbulence becomes large, the oxidation reaction in the mixed region is promoted, and a local temperature is increased. Further, since a sufficient air is supplied to the mixed region, an oxygen concentration is in a high state. Accordingly, in the mixed region, there is established a condition of high temperature and high oxygen concentration corresponding to a requirement for generating the thermal NOx.

As a technique of lowering the thermal NOx, an exhaust gas mixing of mixing a part of the exhaust gas with the combustion air is frequently used in an oil firing boiler and a gas firing boiler. FIG. 27 shows an outline structure of a combustion apparatus to which the exhaust gas mixing is applied.

A part of the exhaust gas is returned by the gas recirculation blower 28, and a part thereof is supplied into the furnace from the furnace bottom gas supply chamber 74, and is used for controlling a temperature of a reheat steam. Further, a part of the exhaust gas is branched in an outlet of the gas recirculation blower 28 for lowering the NOx so as to be introduced into the combustion air flow path 43 through the gas mixing flow path 29. Reference numeral 30 denotes a gas mixing regulating damper provided on the gas mixing flow path 29.

The combustion air with which the exhaust gas is mixed is supplied into the furnace from the burner 2 and the AAP 3. The exhaust gas mixing is a method which can effectively lowering the thermal NOx on the basis of the reduction of the combustion temperature and the reduction of the oxygen concentration in the combustion field. This method can be applied to the boiler employing the oil or the gas which has a high combustion speed as a fuel, with no problem. However, when applying the exhaust gas mixing to the coal firing boiler having a comparatively low combustion speed, the combustion efficiency is largely lowered on the basis of the reduction of the combustion temperature in an entire of the combustion field and the reduction of the oxygen concentration.

Further, in the low NOx coal burner flame, there exists an NOx removing reaction within the flame that the temporarily generated NOx is reduced by an intermediate product, however, it is known that the NOx removing reaction within the flame is improved in the NOx removing efficiency in accordance that the temperature of the flame becomes high. When the flame temperature is reduced by the exhaust gas mixing, there is a case that the generated NOx is rather increased on the basis of the reduction of the NOx removing efficiency.

As mentioned above, the two-stage combustion method has the NOx reducing effect as an entire of the furnace, however, the AAP itself has an effect of generating the NOx. The conventional AAP has a disadvantage that in the case of promoting the mixing between the high-temperature combustion gas and the air within the furnace for achieving the complete combustion by reducing the unburned combustible, the NOx generated in the AAP is increased.

Further, when applying the exhaust gas mixing for reducing the thermal NOx of the coal firing combustion apparatus as mentioned above, there is a disadvantage that an adverse effect such as the reduction of the combustion efficiency and the reduction of the NOx removing reaction within the flame is generated.

DISCLOSURE OF THE INVENTION

An object of the present invention is to provide a combustion apparatus and a wind box which can solve the disadvantage of the prior art, and can inhibit an NOx generation in an AAP even in the case of promoting a mixing between a high-temperature combustion gas and a combustion air so as to intend to reduce an unburned combustible.

In order to achieve the object mentioned above, in accordance with a first aspect of the present invention, there is provided a combustion apparatus comprising:

a burner burning a fuel within a furnace in a theoretical air ratio or less; and an air port arranged in a back flow side of the burner and injecting a combustion air for a shortfall in the burner into the furnace, wherein an inhibiting gas supply means for supplying a nitrogen oxide generation inhibiting gas inhibiting a nitrogen oxide from being generated is provided in a mixing region formed by both of a combustion gas generated by burning the fuel by means of the burner and a combustion air injected from the air port or near the mixing region.

In accordance with a second aspect of the present invention, there is provided a combustion apparatus as recited in the first aspect mentioned above, wherein an inner side of the air port is separated into a flow path injecting the combustion air, and a flow path injecting the nitrogen oxide generation inhibiting gas.

In accordance with a third aspect of the present invention, there is provided a combustion apparatus as recited in the first aspect or the second aspect mentioned above, wherein the nitrogen oxide generation inhibiting gas is constituted by at least one gas selected from a group comprising a combustion exhaust gas, a mixed gas of the combustion exhaust gas and the air, and the air.

In accordance with a fourth aspect of the present invention, there is provided a combustion apparatus as recited in any one of the first aspect to the third aspect mentioned above, wherein the inhibiting gas is injected into the furnace from an outer peripheral portion side of an air injection port of the air port.

In accordance with a fifth aspect of the present invention, there is provided a combustion apparatus as recited in any one of the first aspect to the fourth aspect mentioned above, wherein the inhibiting gas injection port is formed in an annular shape so as to surround the air injection port of the air port.

In accordance with a sixth aspect of the present invention, there is provided a combustion apparatus as recited in any one of the first aspect to the fourth aspect mentioned above, wherein a plurality of the inhibiting gas injecting ports are arranged in a peripheral direction so as to surround the air injection port of the air port.

In accordance with a seventh aspect of the present invention, there is provided a combustion apparatus as recited in any one of the first aspect to the fourth aspect mentioned above, wherein the inhibiting gas injection port is formed approximately in a circular arc shape so as to surround a part of the air injection port of the air port.

In accordance with an eighth aspect of the present invention, there is provided a combustion apparatus as recited in any one of the first aspect to the fourth aspect mentioned above, wherein a plurality of the inhibiting gas injection ports are concentrically arranged in a part of an outer peripheral portion of the air injection port of the air port.

In accordance with a ninth aspect of the present invention, there is provided a combustion apparatus as recited in the seventh aspect or the eighth aspect mentioned above, wherein the inhibiting gas injection port is arranged in the burner side of the air injection port of the air port.

In accordance with a tenth aspect of the present invention, there is provided a combustion apparatus as recited in any one of the first aspect to the tenth aspect mentioned above, wherein a system for supplying a part of the exhaust gas recirculation within the furnace as the nitrogen oxide inhibiting gas in a branched state.

In accordance with an eleventh aspect of the present invention, there is provided a combustion apparatus as recited in the tenth aspect mentioned above, wherein a blower exclusive for the inhibiting gas is placed in the inhibiting gas supply system.

In accordance with a twelfth aspect of the present invention, there is provided a combustion apparatus as recited in the tenth aspect mentioned above, wherein the inhibiting gas is constituted by an exhaust gas after a temperature thereof is lowered by a heat exchanger.

In accordance with a thirteenth aspect of the present invention, there is provided a combustion apparatus as recited in any one of the first aspect to the twelfth aspect mentioned above, wherein a plurality of air ports are placed along a width direction of the furnace, and each of the air ports is provided with the inhibiting gas supply means and a flow rate regulating means for regulating a flow rate of the inhibiting gas.

In accordance with a fourteenth aspect of the present invention, there is provided a combustion apparatus as recited in any one of the first aspect to the thirteenth aspect mentioned above, wherein a plurality of air ports are placed along a width direction of the furnace, each of the air ports is provided with the inhibiting gas supply means, and the inhibiting gas is supplied more to the air port close to the furnace center portion than the air port close to the furnace side wall in a plurality of air ports.

In accordance with a fifteenth aspect of the present invention, there is provided a combustion apparatus as recited in the thirteenth aspect or the fourteenth aspect mentioned above, wherein a total supply flow rate of the inhibiting gas supplied to a plurality of air ports is variable in correspondence to a load of the combustion apparatus.

In accordance with a sixteenth aspect of the present invention, there is provided a combustion apparatus as recited in the thirteenth aspect or the fourteenth aspect mentioned above, wherein a total supply flow rate of the inhibiting gas supplied to a plurality of air ports is variable in correspondence to a nitrogen oxide discharging concentration of the combustion apparatus.

In accordance with a seventeenth aspect of the present invention, there is provided a wind box having an air port arranged in a back flow side of a burner and supplying a combustion air which corresponds to a shortfall in the burner, wherein an inhibiting gas wind box for supplying an inhibiting gas inhibiting generation of a nitrogen oxide is provided in a mixing region formed by both of a combustion gas generated by burning a fuel by means of the burner and a combustion air injected from the air port or near the mixing region, within the wind box for the air port.

In accordance with an eighteenth aspect of the present invention, there is provided a wind box as recited in the seventeenth aspect, wherein an air port wind box which is common to a plurality of the air ports is provided, and an inhibiting gas wind box which is common to a plurality of air ports is provided within the air port wind box.

In accordance with a nineteenth aspect of the present invention, there is provided a wind box as recited in the seventeenth aspect, wherein an air port wind box which is common to a plurality of the air ports is provided, and inhibiting gas wind boxes which are individual to a plurality of air ports is provided within the air port wind box.

In accordance with a twentieth aspect of the present invention, there is provided a wind box as recited in the seventeenth aspect, wherein an inhibiting gas injection port of the inhibiting gas wind box is provided in an outer peripheral portion side of an air injection outlet of the air port.

In accordance with a twenty first aspect of the present invention, there is provided a wind box as recited in the twentieth aspect, wherein the inhibiting gas injection port is formed in an annular shape so as to surround the air injection port of the air port.

In accordance with a twenty second aspect of the present invention, there is provided a wind box as recited in the twentieth aspect, wherein a plurality of the inhibiting gas injection ports are arranged in a peripheral direction so as to surround the air injection port of the air port.

In accordance with a twenty third aspect of the present invention, there is provided a wind box as recited in the twentieth aspect, wherein the inhibiting gas injection port is formed in an approximately circular arc shape so as to surround a part of the air injection port of the air port.

In accordance with a twenty fourth aspect of the present invention, there is provided a wind box as recited in the twentieth aspect, wherein a plurality of the inhibiting gas injection ports are arranged concentrically in a part of an outer peripheral portion of the air injection port of the air port.

In accordance with a twenty fifth aspect of the present invention, there is provided a wind box as recited in the twenty third aspect or the twenty fourth aspect, wherein the inhibiting gas injection port is arranged in a burner side of the air injection port of the air port.

In order to promote the mixing between the air supplied from the AAP for lowering the unburned combustible and the high-temperature combustion gas within the furnace, there is executed strengthening a penetration of the jet flow by increasing the injecting speed of the air jet flow or applying the swivel to the air jet flow. In both the cases, a non-steady turbulence (an intensity of turbulence) in the mixing interface between the high-temperature air and the high-temperature combustion gas shown in FIGS. 21 and 22 becomes strong. In this case, in the conventional AAP, a temperature becomes high and an oxygen concentration becomes high in the mixing interface having the large intensity of turbulence. This is because the combustion gas having the high temperature and the air having the high oxygen concentration are directly brought into contact with each other.

If the condition of the high intensity of turbulence, the high temperature and the high oxygen concentration is established, NOx is generated. When executing the mixing promotion for reducing the unburned combustible by the conventional AAP, the condition mentioned above is established, so that NOx is generated. In the present invention, since the gas having a low temperature and a low oxygen concentration (the exhaust gas, the mixed gas between the exhaust gas and the air, the low-temperature air or the like) is supplied to the mixed region (the mixing interface) or the portion near the mixed region, NOx is not generated or the NOx is inhibited from being generated.

BRIEF DESCRIPTION OF THE DRAWINGS

FIG. 3A is a schematic view of an outline structure of an AAP in accordance with a third embodiment of the present invention;

FIG. 3B is a visual field diagram on a line A-A in FIG. 3A;

FIG. 4A is a schematic view of an outline structure of an AAP in accordance with a fourth embodiment of the present invention;

FIG. 4B is a visual field diagram on a line B-B in FIG. 4A;

FIG. 10 is a schematic view of an enlarged structure near a two-stage combustion air wind box in accordance with the embodiment;

FIG. 11 is an explanatory view showing a flow state of an air jet flow near the wind box, an AAP exhaust gas jet flow and an unburned gas ascending flow from a burner portion side;

FIG. 13A is a schematic view of an enlarged structure near a two-stage combustion air wind box in accordance with a tenth embodiment of the present invention;

FIG. 13B is a view showing an arranged state of an inhibiting gas injection port;

BEST MODE FOR CARRYING OUT THE INVENTION

Figure 1:
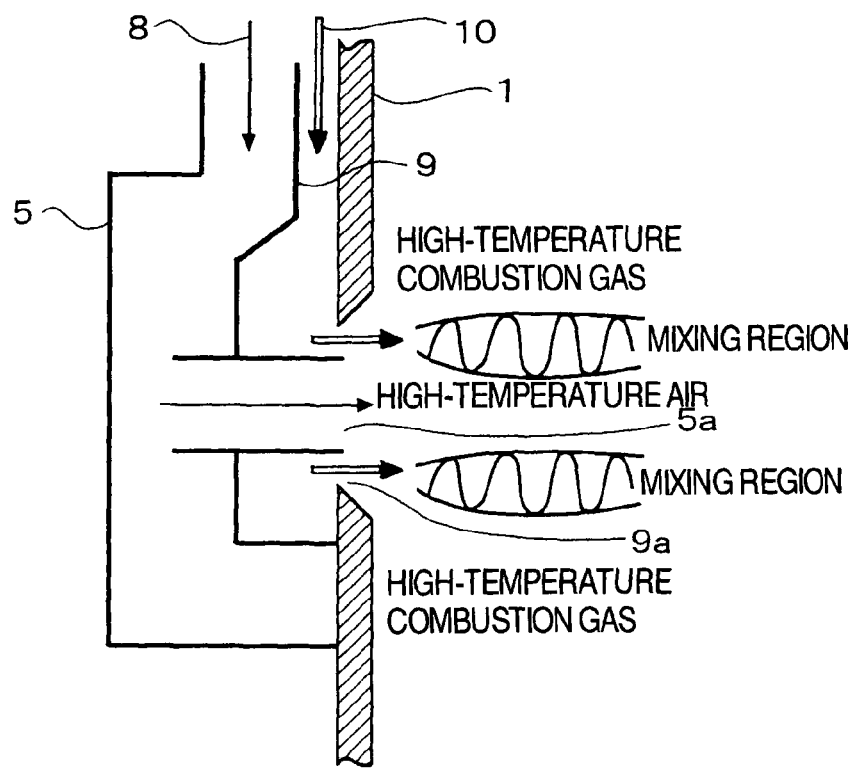
FIG. 1 is a schematic view of an outline structure of an AAP in accordance with a first embodiment of the present invention.

Next, a description will be given of an embodiment in accordance with the present invention with reference to the accompanying drawings. FIG. 1 is a schematic view of an outline structure of an AAP in accordance with a first embodiment. An AAP wind box 5 is placed in a water wall 1, and an NOx generation inhibiting gas wind box 9 is placed in an inner portion thereof so as to form a double structure. An inhibiting gas injection port 9a formed in a furnace side of the inhibiting gas wind box 9 is provided annularly in an outer peripheral portion side of an AAP air injection port 5a formed in the furnace side of the AAP wind box 5.

The high-temperature air flow 8 is introduced to the AAP wind box 5, and is injected into the furnace linearly from the AAP air injection port 5a. The NOx generation inhibiting gas 10 constituted by the exhaust gas is introduced into the inhibiting gas wind box 9, and is injected into the furnace toward a periphery of the high-temperature air jet flow, that is, a mixing region of the both (a wavy line portion in the drawing) formed by the high-temperature combustion gas and the high-temperature air (the air for combustion) within the furnace or a portion near the same.

As mentioned above, the AAP is constituted by the double structure, and the high-temperature air 8 is supplied into the furnace from the center portion, and the inhibiting gas 10 is supplied into the furnace from the outer peripheral portion thereof. In this case, if the injecting speed of the high-temperature air jet flow is increased for promoting the mixing of the high-temperature air 8, the inhibiting gas 10 constituted by the exhaust gas having the low temperature and the low oxygen concentration is supplied to the mixing region of the high-temperature air 8 and the high-temperature combustion gas or the portion near the same. Accordingly, the generation of NOx is inhibited. In other words, the present invention can achieve the simultaneous reduction of the unburned combustible and the generat4ed NOx, which can not be achieved by the conventional AAP.

In this case, when mixing the exhaust gas with the high-temperature air supplied from the AAP, it is possible to inhibit the generation of NOx due to the reduction of the oxygen concentration and the reduction of the gas temperature on the basis of the dilution, however, this is not preferable because the efficiency of the power generating plant is lowered on the basis of the recirculation of a lot of exhaust gas. In accordance with the present invention, since it is possible to inhibit the generation of NOx by supplying a small amount of inhibiting gas 10 only to the mixing region of the high-temperature air and the high-temperature combustion gas corresponding to the portion in which the thermal NOx is generated, the efficiency of power generation is not lowered.

In the present embodiment, the exhaust gas is used as the inhibiting gas 10, however, the same effect can be obtained by supplying the mixed gas of the exhaust gas and the air or the low-temperature air from the inhibiting gas injection port 9a in the outer peripheral side of the AAP flow path.

Figure 2:
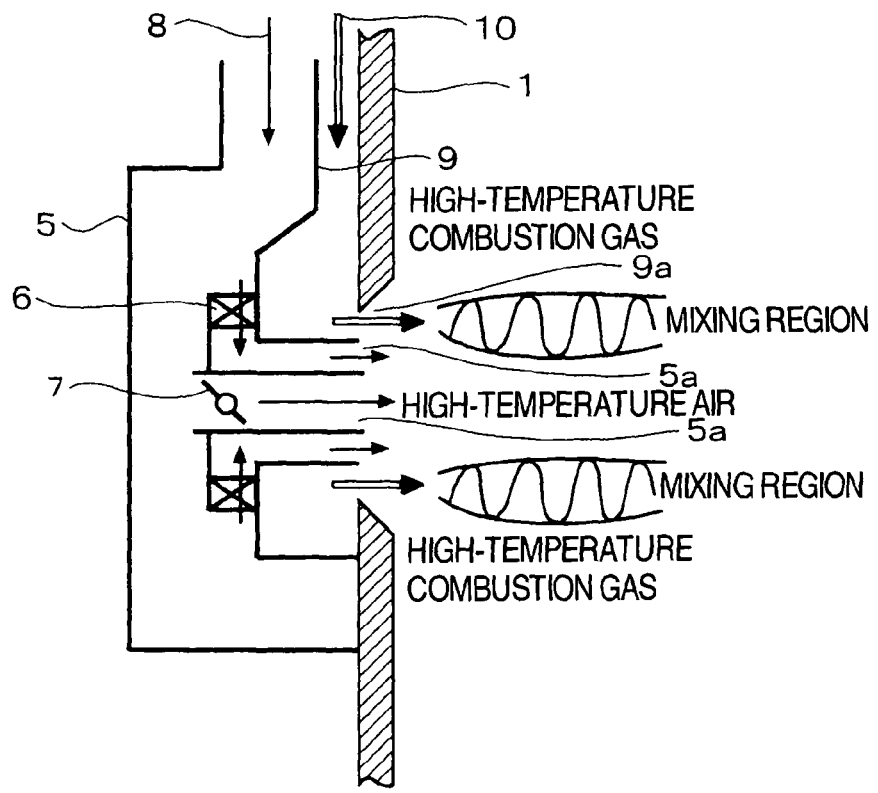
FIG. 2 is a schematic view of an outline structure of an AAP in accordance with a second embodiment of the present invention.

FIG. 2 is a schematic view of an outline structure of an AAP in accordance with a second embodiment. In the present embodiment, the structure is made such that an inhibiting gas 10 constituted by a high-temperature air straight flow having a flow rate controlled by a damper 7, a high-temperature air swirling flow passing through a swiveling device 6 and an inhibiting gas 10 constituted by the exhaust gas is supplied into the furnace. In other words, the AAP is formed in a multiple structure (a triple structure in the present embodiment), and inhibits the generation of NOx by supplying the inhibiting gas 10 from the outermost periphery.

In the combustion apparatus in which a lot of AAP 3 are arranged, an arrangement of the AAP wind box 5 and the inhibiting gas wind box 9 comes into question. Third and fourth embodiments are shown in FIGS. 3A, 3B, 4A and 4B.

FIG. 3B is a visual field diagram on a line A-A in FIG. 3A. In this third embodiment, a plurality of AAP 3 are placed in the water wall 1, however, the high-temperature air flow 8 is supplied from the common AAP wind box 5. The common inhibiting gas wind box 9 is placed in an inner portion of the AAP wind box 5, and supplies the inhibiting gas 10 through the common inhibiting gas wind box 9.

FIG. 4B is a visual field diagram on a line B-B in FIG. 4A. In this fourth embodiment, the individual inhibiting gas wind box 9 is placed in an inner portion of the common AAP wind box 5.

Figure 5:
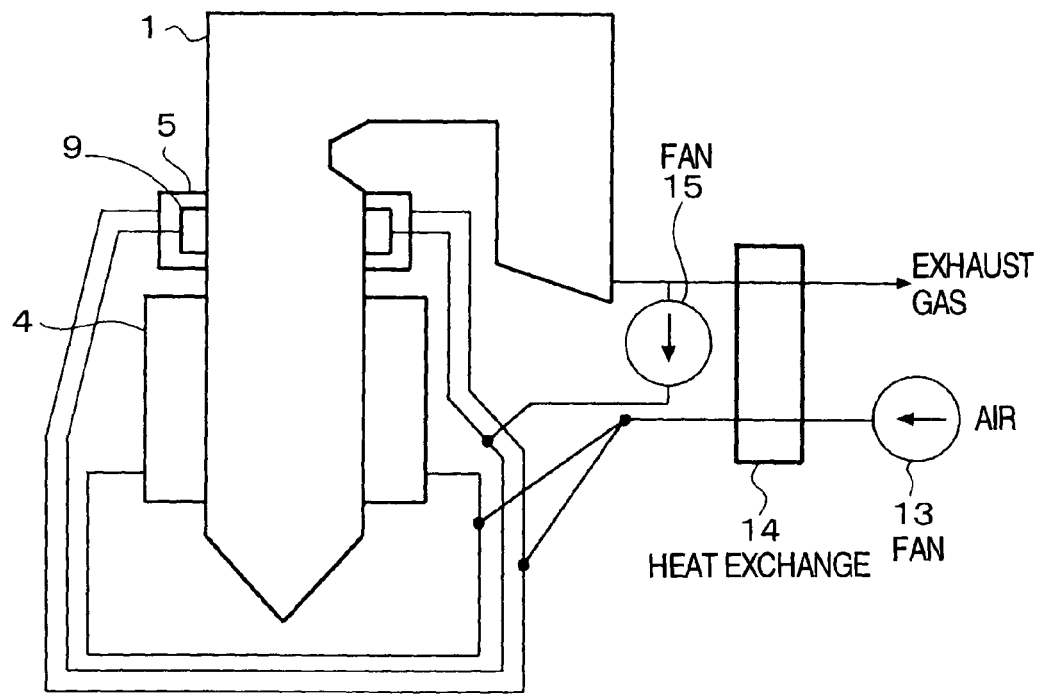
FIG. 5 is a schematic view of an outline structure of a combustion apparatus for explaining a route supplying an exhaust gas to an inhibiting gas wind box in accordance with a fifth embodiment of the present invention.

Next, a description will be given of the supply path of the exhaust gas corresponding to the inhibiting gas and the air on the basis of embodiments shown in FIGS. 5 to 7. In these drawings, reference numeral 13 denotes a first blower, reference numeral 14 denotes a heat exchanger, and reference numeral 15 denotes a second blower. In a fifth embodiment shown in FIG. 5, the inhibiting gas constituted by the exhaust gas is supplied to the inhibiting gas wind box 9 by the second blower 15. A gas temperature of the inhibiting gas is between about 250 and 350° C., and an oxygen percentage content thereof is between about 2 and 6%.

Figure 6:
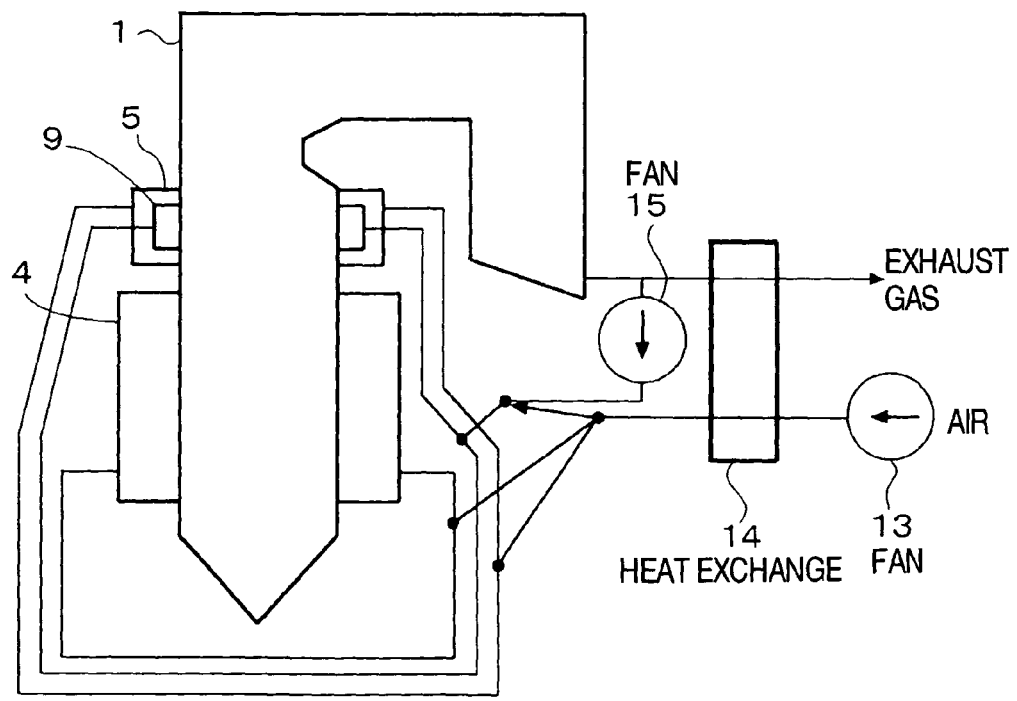
FIG. 6 is a schematic view of an outline structure of a combustion apparatus for explaining a route supplying a mixed gas of an exhaust gas and an air to an inhibiting gas wind box in accordance with a sixth embodiment of the present invention.

In a sixth embodiment shown in FIG. 6, the combustion air passing through the heat exchanger 14 and the exhaust gas from the second blower 15 are mixed at a proper rate, and the inhibiting gas constituted by the mixed gas is supplied to the inhibiting gas wind box 9. For example, in the case of mixing the combustion air at about 10%, the gas temperature of the inhibiting gas is between about 250 and 350° C., and the oxygen percentage content is between about 5 and 9%.

Figure 7:
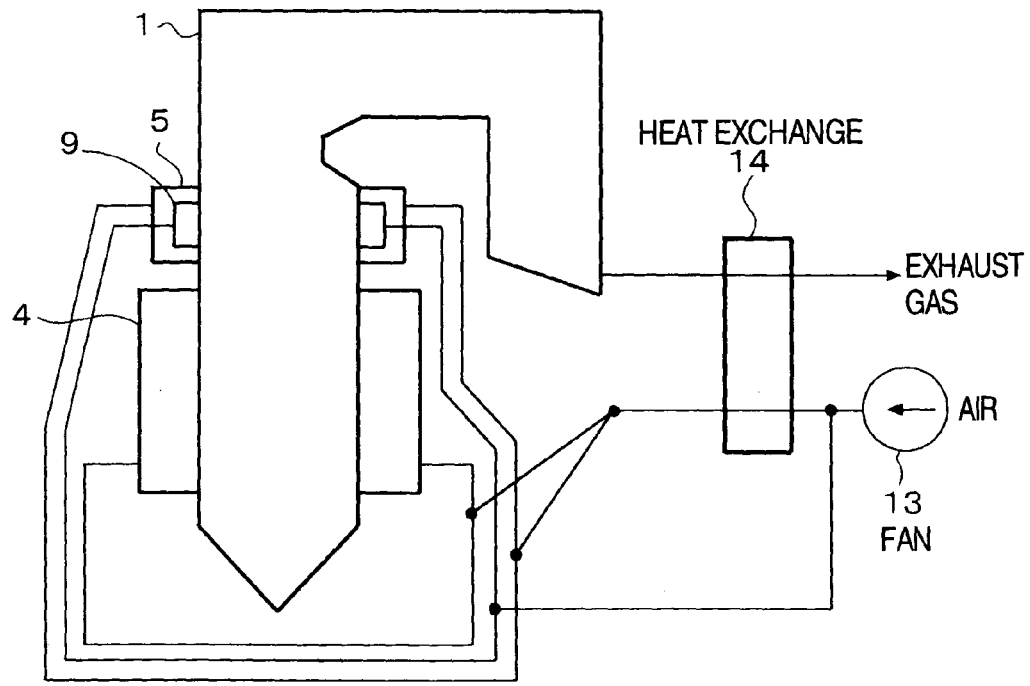
FIG. 7 is a schematic view of an outline structure of a combustion apparatus for explaining a route supplying a low-temperature air to an inhibiting gas wind box in accordance with a seventh embodiment of the present invention.

In a seventh embodiment shown in FIG. 7, the low-temperature air from the first blower 15 is directly supplied as the inhibiting gas to the inhibiting gas wind box 9 without passing through the heat exchanger 14. The gas temperature of the inhibiting gas is approximately equal to the atmospheric temperature, and the oxygen percentage content is about 20%.

Figure 8:
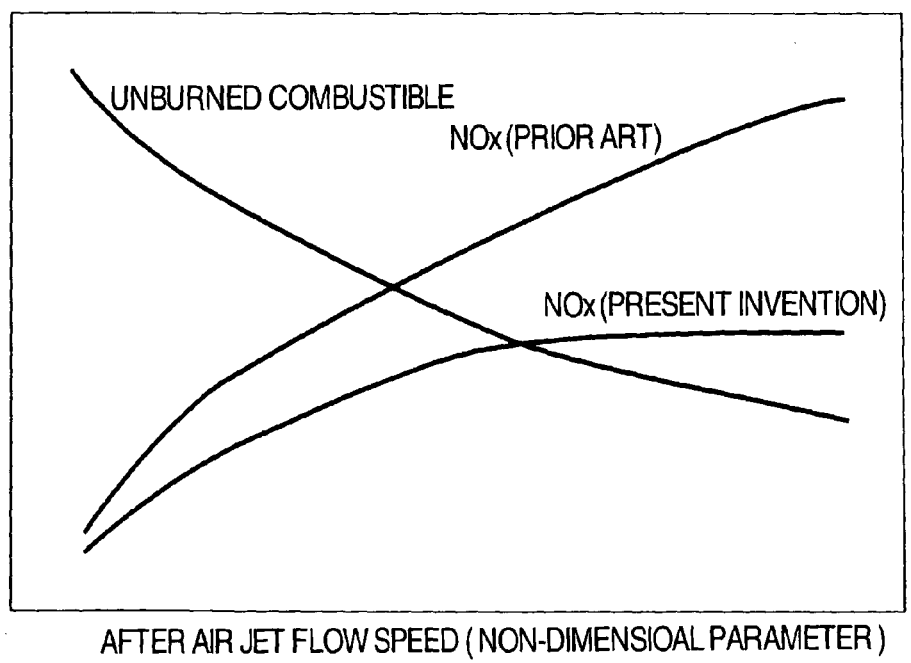
FIG. 8 is a characteristic view for explaining an effect obtained by applying to the present invention.

An effect obtained by applying the present invention to the combustion apparatus such as the coal firing power generating boiler or the like will be explained in FIG. 8. Since the mixing between the combustion gas and the air is promoted by increasing the after air injecting speed, the unburned combustible is lowered as shown in FIG. 8. This tendency is the same between the present invention and the prior art. On the other hand, the exhaust amount of the NOx is increased in accordance with the increase of the after air injecting speed. This is because the oxidation of the nitrogen content is generally promoted and the NOx is generated in the case that the combustion corresponding to the fuel oxidation reaction is promoted. In the prior art, it is impossible to achieve the simultaneous reduction of the unburned combustible and the NOx. However, since the generation of NOx can be inhibited in the mixing region of the high-temperature air and the high-temperature combustion gas by applying the present invention, the generation of NOx in the case of increasing the after air injecting speed is less in comparison with the prior art as shown in FIG. 8.

Figure 9:
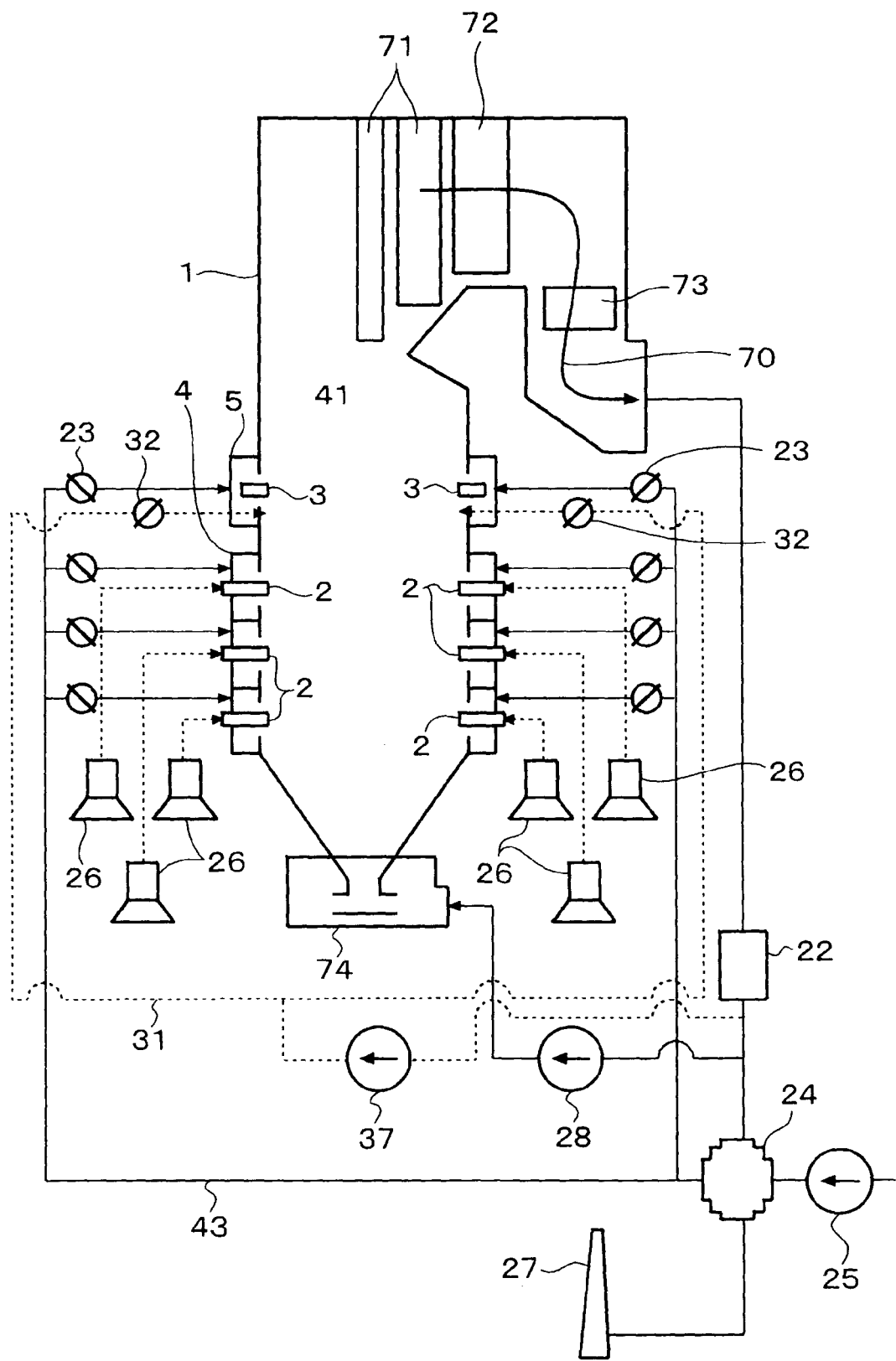
FIG. 9 is a schematic view of an outline structure of a combustion apparatus in accordance with an eighth embodiment of the present invention.

FIG. 9 is a schematic view of an outline structure of a combustion apparatus in accordance with an eighth embodiment. In the present embodiment, a part of the exhaust gas is supplied to a furnace 41 from a furnace bottom gas supply chamber 74 by a gas recirculation blower 28, and is devoted to an adjustment of a heat transfer amount in heat transfer devices 71, 72 and 73 on the basis of a convective heat transfer, that is, a control of a steam temperature. Further, the other part of the exhaust gas is increased in pressure by an AAP exhaust gas recirculation blower 37 so as to form an NOx generation inhibiting gas, and is injected into the furnace from an AAP 5 through an AAP exhaust gas recirculation flow path 31.

In the present embodiment, since the AAP exhaust gas recirculation blower 37 is placed for an exclusive use, it is possible to easily set an appropriate condition for the AAP exhaust gas recirculation regardless of the condition of the exhaust gas recirculation from the furnace bottom portion used for controlling the steam temperature.

FIG. 10 is a schematic view of an enlarged structure near a two-stage combustion air wind box in accordance with the embodiment, and FIG. 11 is an explanatory view showing a flow state of an air jet flow near the wind box, an AAP exhaust gas jet flow and an unburned gas ascending flow from a burner portion side.

In these drawings, reference numeral 1 denotes a water wall, reference numeral 32 denotes an AAP exhaust gas recirculation amount adjusting damper, reference numeral 33 denotes an AAP exhaust gas supply tube, reference numeral 34 denotes an AAP exhaust gas supply ring, reference numeral 35 denotes an AAP exhaust gas supply flow path, reference numeral 36 denotes an AAP exhaust gas jet flow, reference numeral 38 denotes an unburned gas ascending flow, and reference numeral 41 denotes a furnace. Further, reference numeral 101 denotes a two-stage combustion air wind box, reference numeral 102 denotes an AAP primary air flow path, reference numeral 103 denotes an AAP secondary air flow path, reference numeral 104 denotes an AAP secondary air register, reference numeral 105 denotes an AAP primary air, reference numeral 106 denotes an AAP secondary air, and reference numeral 107 denotes an air jet flow. In this case, reference numeral 1000 denotes an opening portion for introducing the AAP primary air 105 to the AAP primary electric flow path 102 from the two-stage combustion air wind box 101.

In the case of the present embodiment, the inhibiting gas injection port 9a of the AAP exhaust gas supply flow path 35 is arranged so as to surround an entire of the air injection port 5a of the AAP air flow paths 102 and 103. The recirculation gas a flow rate of which is adjusted to a predetermined flow rate by the AAP exhaust gas recirculation amount adjusting damper 32 is introduced to the AAP exhaust gas supply ring 34 through the AAP exhaust gas supply tube 33, passes through the AAP exhaust gas supply flow path 35 as shown in FIG. 11, and is injected as the AAP exhaust gas jet flow 36 to an outer peripheral portion of the air jet flow 107 from the inhibiting gas injection port 9a.

As mentioned above, the exhaust gas supply flow path 35 is placed in an outer side in a diametrical direction of the AAP secondary air flow path 103, and the exhaust gas is supplied so as to surround the two-stage combustion air (the air jet flow 107). In accordance with the present structure, as shown in FIG. 11, it is possible to supply the exhaust gas to the mixing region in which the unburned combustible in the unburned gas ascending flow 38 from the burner side starts combustion by the two-stage combustion air or (and) the portion near the same.

Figure 12A:
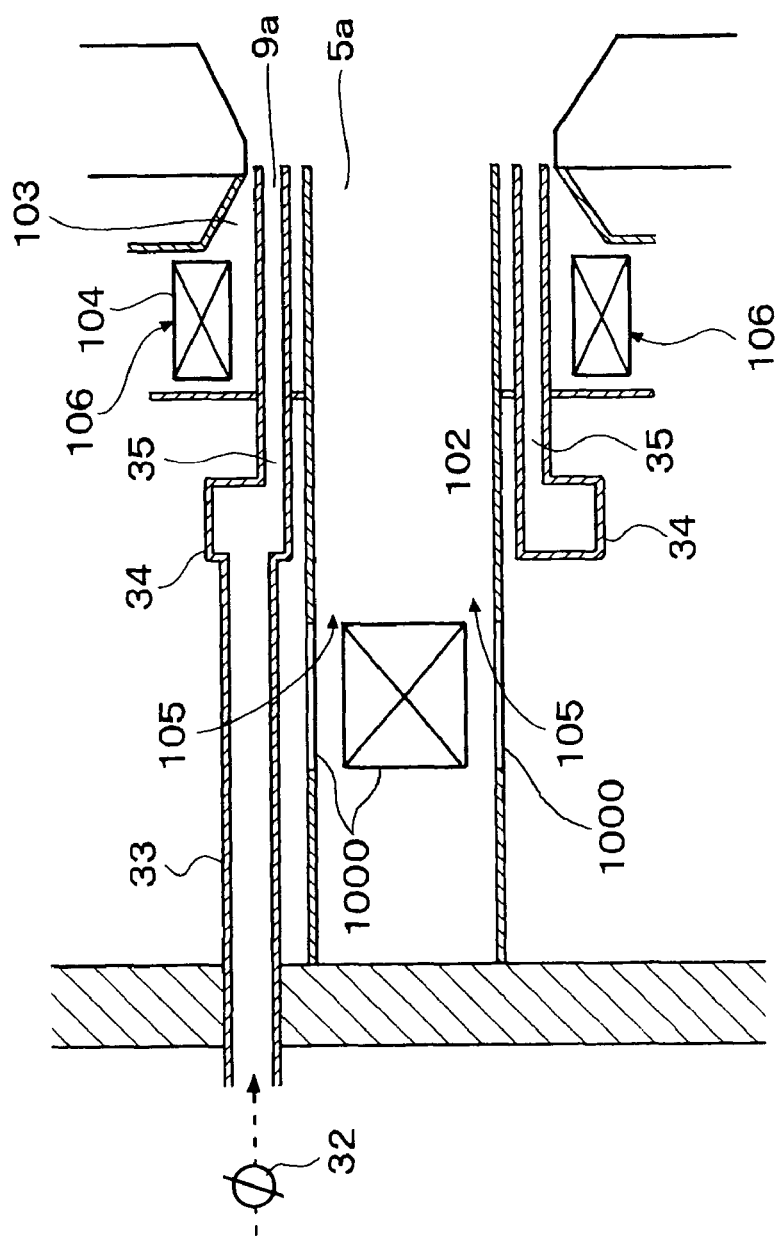
FIG. 12A is a schematic view of an enlarged structure near a two-stage combustion air wind box in accordance with a ninth embodiment of the present invention.
Figure 12B:
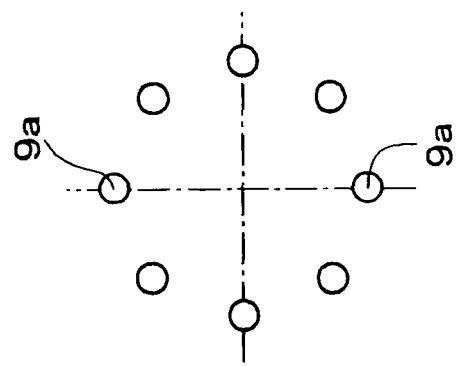
FIG. 12B is a view showing an arranged state of an inhibiting gas injection port.

FIGS. 12A and 12B are schematic views of an enlarged structure near a two-stage combustion air wind box in accordance with a ninth embodiment, in which FIG. 12A is a schematic view of an entire structure near the wind box, and FIG. 12B is a view showing an arranged state of an inhibiting gas injection port.

In the case of the present embodiment, the AAP exhaust gas supply flow path 35 is formed by a plurality of exhaust gas supply nozzles, the exhaust gas supply nozzles are placed in an outer peripheral portion in the AAP secondary air flow path 103, and a plurality of inhibiting gas injection ports 9a of the AAP exhaust gas supply flow path 35 are placed in a peripheral direction as shown in FIG. 12B.

In accordance with this structure, the exhaust gas is mixed so as to surround the two-stage combustion air. It is possible to supply the exhaust gas to the region in which the unburned component ascending from the burner starts combustion on the basis of the two-stage combustion air, in the same manner as the embodiment in FIG. 11. In the present embodiment, it is possible to place the exhaust gas supply nozzle by applying a comparatively simple modification to the existing two-stage combustion air port.

Figure 14:
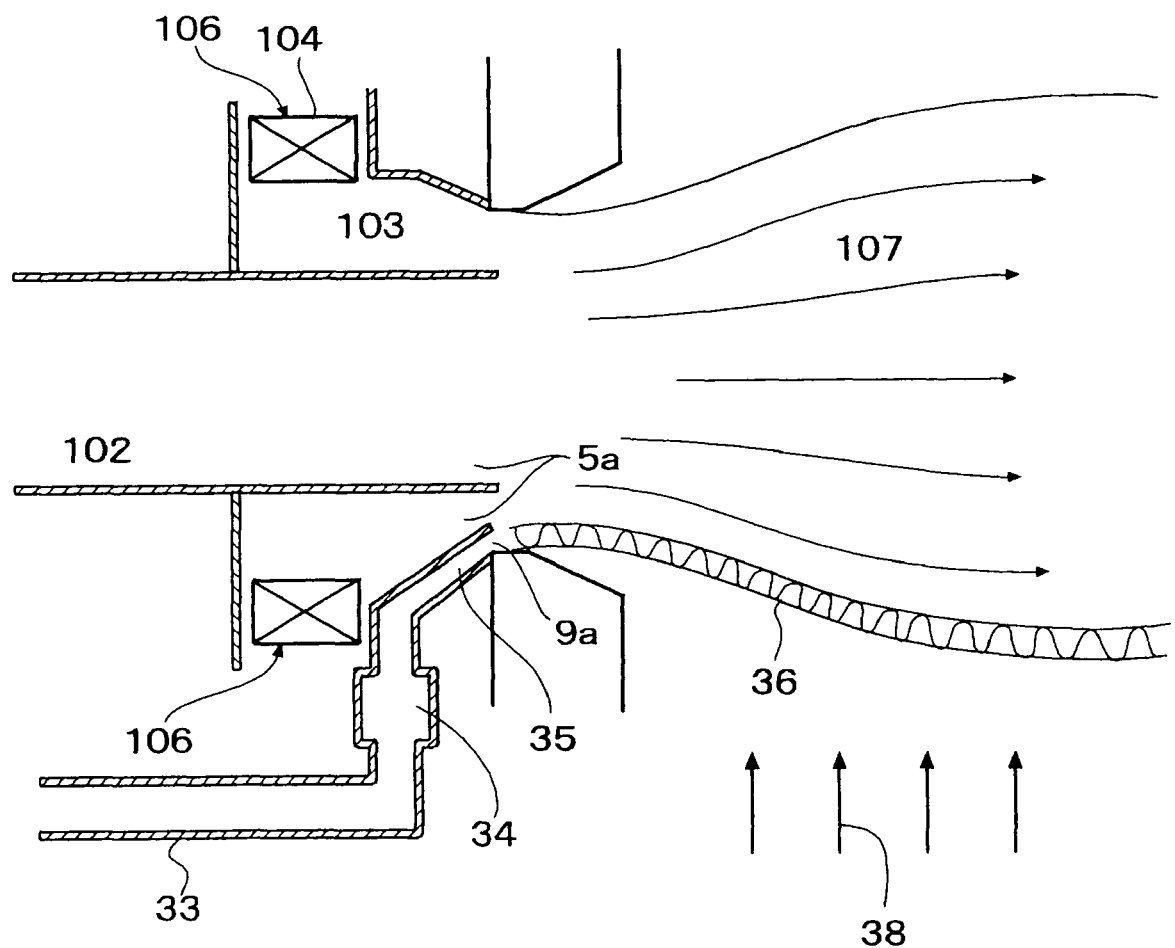
FIG. 14 is an explanatory view showing a flow state of an air jet flow near the wind box, an AAP exhaust gas jet flow and an unburned gas ascending flow from a burner portion side.

FIGS. 13A and 13B are schematic views of an enlarged structure near a two-stage combustion air wind box in accordance with a tenth embodiment, in which FIG. 13A is a schematic view of an entire structure near the wind box, and FIG. 13B is a view showing an arranged state of an inhibiting gas injection port. FIG. 14 is an explanatory view showing a flow state of an air jet flow near the wind box, an AAP exhaust gas jet flow and an unburned gas ascending flow from a burner portion side.

In the case of the present embodiment, as shown in FIG. 13B, the inhibiting gas injection port 9a of the exhaust gas supply nozzle formed in a semi-ring shape (a circular arc shape) is placed only in a lower side of an outer peripheral portion in the AAP secondary air flow path 103, and the AAP exhaust gas jet flow 36 is injected from here (refer to FIG. 14). As shown in FIG. 14, since the AAP exhaust gas jet flow 36 can be formed only in a lower side of the AAP air jet flow 107 in which the unburned component ascending from the burner portion side starts combustion on the basis of the two-stage combustion air, it is possible to obtain the same NOx reduction effect by a small amount of recirculation gas.

Figure 15B:
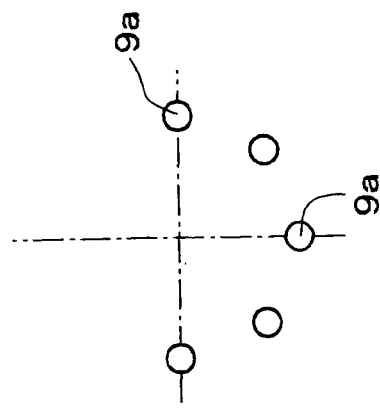
FIG. 15B is a view showing an arranged state of an inhibiting gas injection port.
Figure 15A:
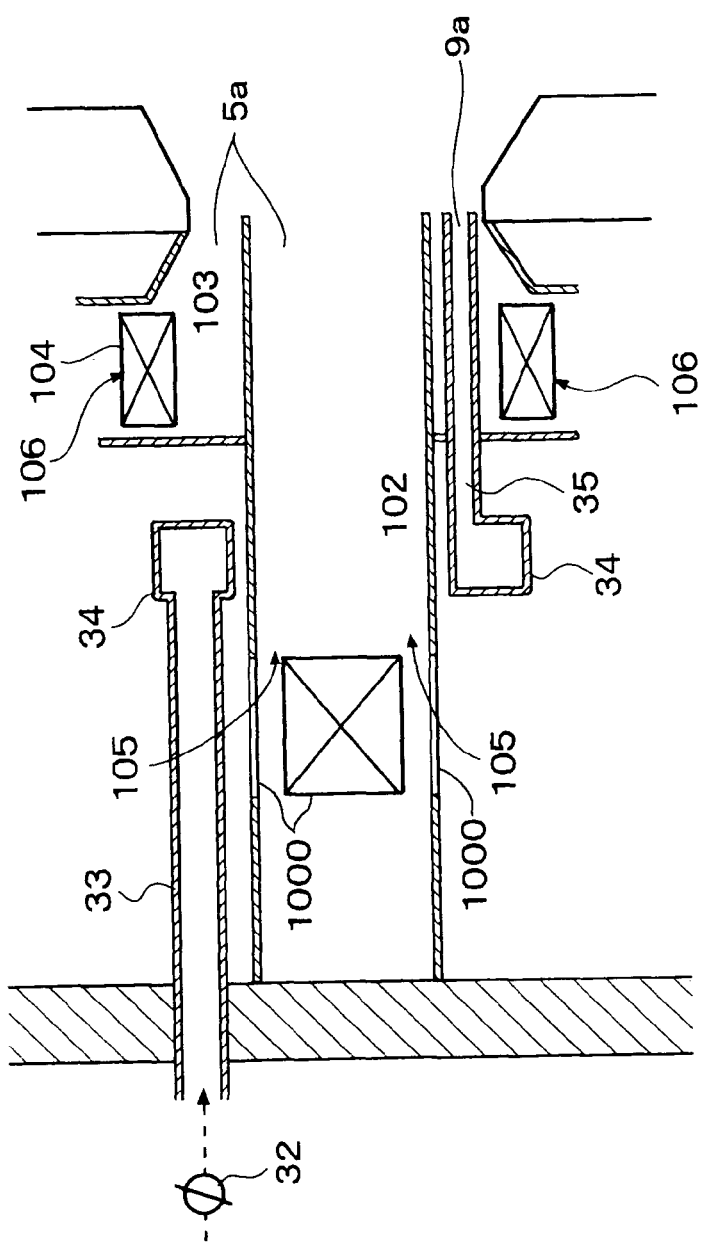
FIG. 15A is a schematic view of an enlarged structure near a two-stage combustion air wind box in accordance with an eleventh embodiment of the present invention.

FIGS. 15A and 15B are schematic view of an enlarged structure near a two-stage combustion air wind box in accordance with an eleventh embodiment, in which FIG. 15A is a schematic view of an entire structure near the wind box, and FIG. 15B is a view showing an arranged state of an inhibiting gas injection port.

In the case of the present embodiment, a plurality of inhibiting gas injection ports 9a of the exhaust gas supply nozzle are placed concentrically only in a lower side of an outer peripheral portion of the AAP secondary air flow path 103. In this case, in the same manner as FIG. 14, since it is possible to form the AAP exhaust gas jet flow only in the lower side of the AAP air jet flow in which the unburned component ascending from the burner starts combustion on the basis of the two-stage combustion air, the same NOx reduction effect can be obtained by a small amount of recirculation gas.

In the case of the tenth and eleventh embodiments, the AAP exhaust gas supply ring 34 may be actually formed in a semi-ring shape in correspondence to the inhibiting gas injection port 9a in place of a complete ring shape.

Figure 16:
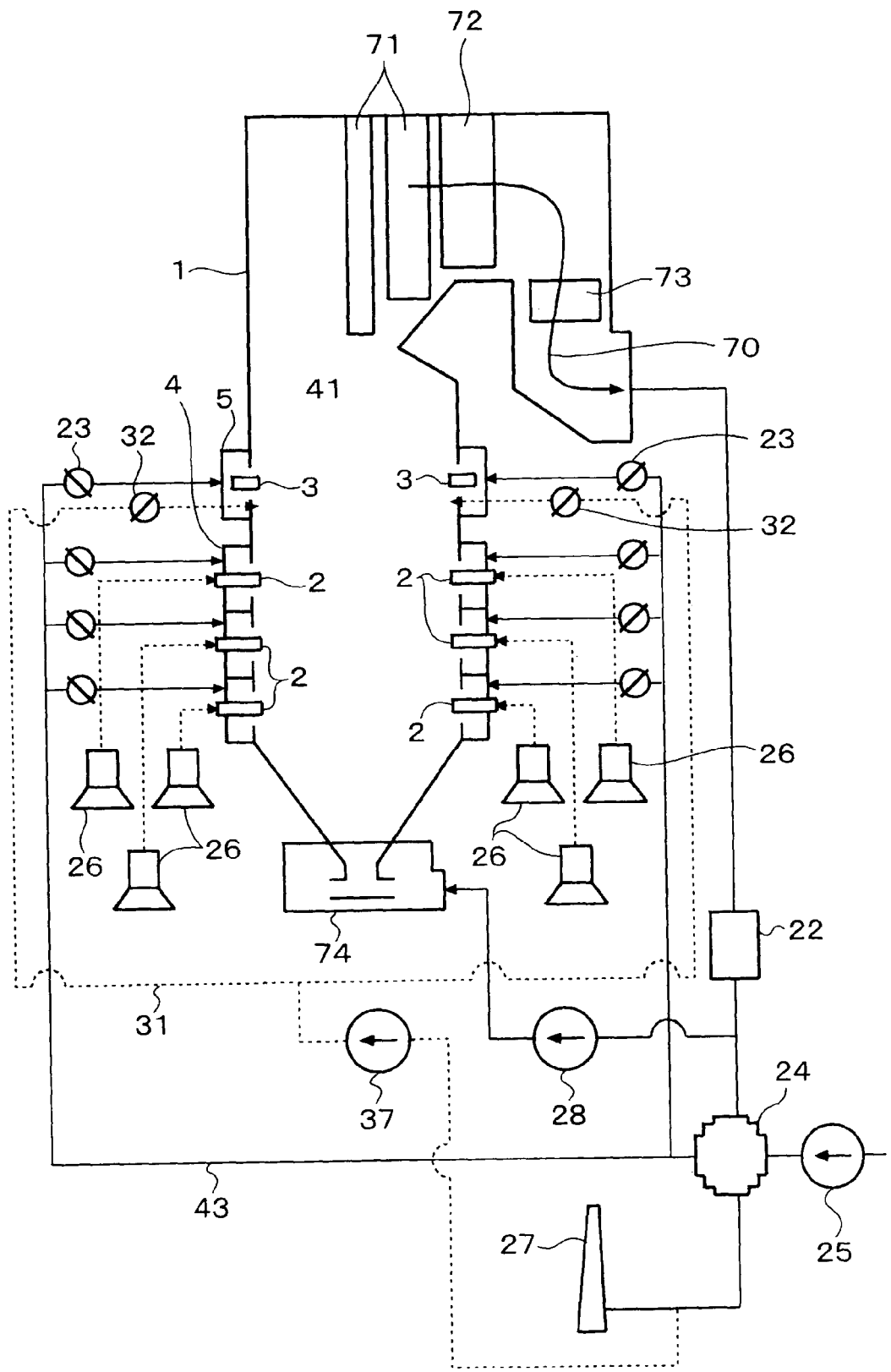
FIG. 16 is a schematic view of an outline structure of a combustion apparatus in accordance with a twelfth embodiment of the present invention.

FIG. 16 is a schematic view of an outline structure of a combustion apparatus in accordance with a twelfth embodiment. In the case of the present embodiment, since the low-temperature exhaust gas in which the heat is recovered through the heat exchanger such as the air preheater 24 or the like is supplied to the AAP wind box 5, there is obtained an effect of reducing the thermal NOx on the basis of the temperature reduction.

Figure 17A:
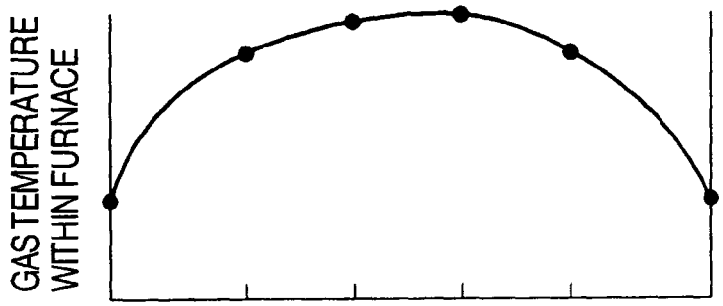
FIG. 17A is a view showing a distribution state of a gas temperature within a furnace in a width direction within the furnace.
Figure 17B:
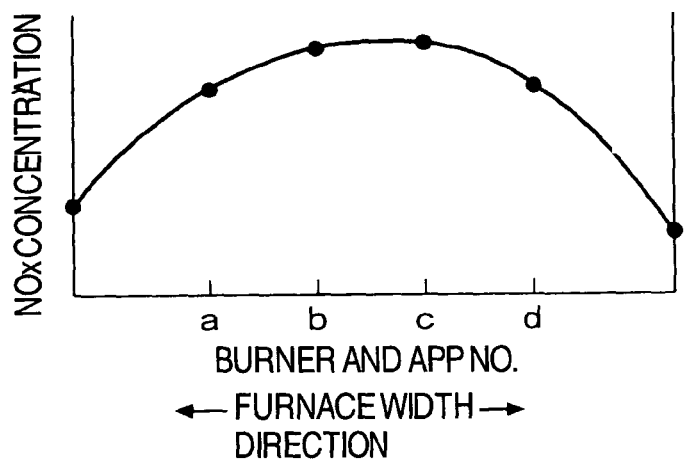
FIG. 17B is a view showing a distribution state of an NOx generating concentration in a width direction within the furnace.

FIGS. 17A and 17B are views showing a distribution state of a gas temperature within a furnace in a width direction within the furnace, and an NOx generating concentration in the width direction within the furnace. As shown in FIG. 17A, the gas temperature within the furnace is lower in the portion close to the side wall of the furnace (the portion close to right and left ends in the direction of the drawing), and is higher in the center portion of the furnace. Accordingly, as shown in FIG. 17B, the NOx generating concentration becomes higher in the center portion of the furnace in which the temperature is high. In the case that a plurality of AAP are provided in the width direction of the furnace, it is possible to effectively reduce the NOx by supplying more exhaust gas to the center portion of the furnace than to the portion close to the side wall of the furnace.

Figure 18:
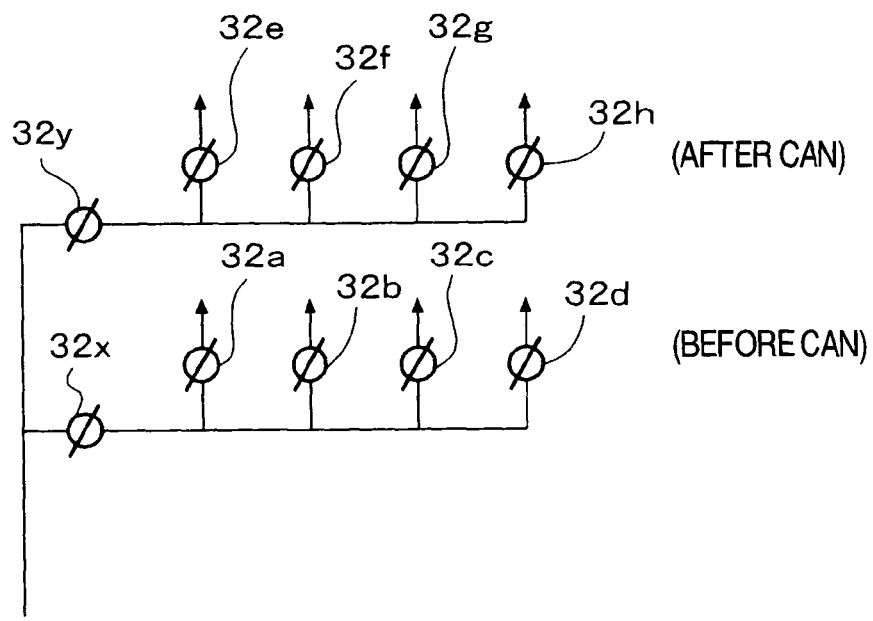
FIG. 18 is a view for explaining an opening degree adjustment of a plurality of adjusting dampers arranged in a back flow side of an AAP exhaust gas recirculation amount adjusting damper placed in front and rear sides of a can.

FIG. 18 is a view for explaining an opening degree adjustment of a plurality of adjusting dampers 32a to 32h arranged in a back flow side of the AAP exhaust gas recirculation amount adjusting damper 32 placed in front and rear sides of a can. As shown in the drawing, the adjusting dampers 32a to 32d are individually placed in a back flow side of the AAP exhaust gas recirculation amount adjusting damper 32X in the front side of the can in correspondence to the respective AAP (not shown) arranged in the width direction of the furnace. The adjusting dampers 32e to 32h are placed in the back flow side of the AAP exhaust gas recirculation amount adjusting damper 32Y in the rear side of the can in the same manner.

As is apparent from the result of FIGS. 17A and 17B mentioned above, the gas temperature within the furnace is lower in the portion close to the side wall of the furnace and is higher in the center portion. Accordingly, the NOx generation concentration becomes higher in the center portion of the furnace in which the temperature is higher. A lot of exhaust gas is supplied to the center portion of the furnace having a lot of NOx generation amount, by setting the damper opening degree of the adjusting dampers 32a, 32d, 32e and 32h placed in the portion close to the side wall in both the front and rear sides of the can small and setting the damper opening degree of the adjusting dampers 32b, 32c, 32f and 32g placed in the center portion side within the furnace large in correspondence to the condition of the gas temperature within the furnace as mentioned above.

Figure 19:
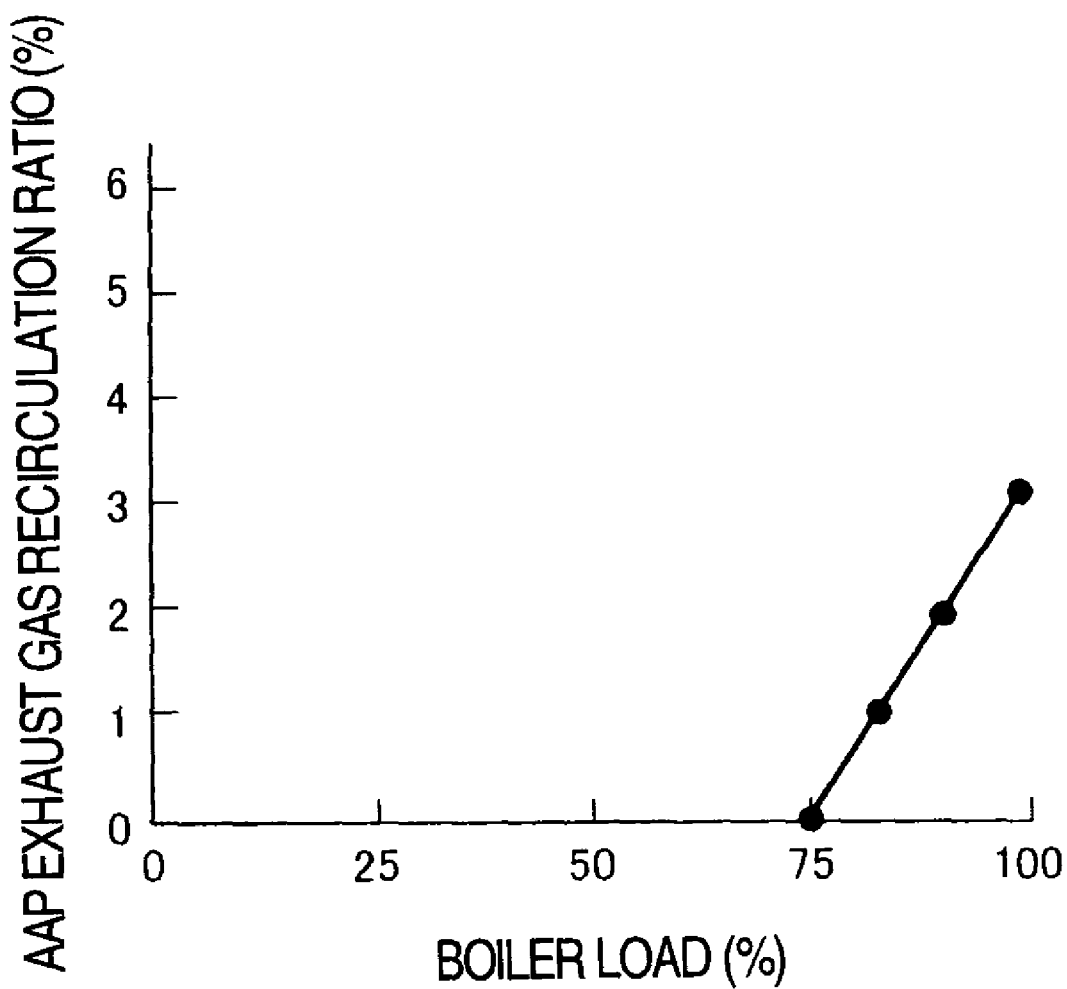
FIG. 19 is a view for explaining an example for setting a flow rate of an AAP recirculation gas in the embodiment of the present invention.
Figure 20B:
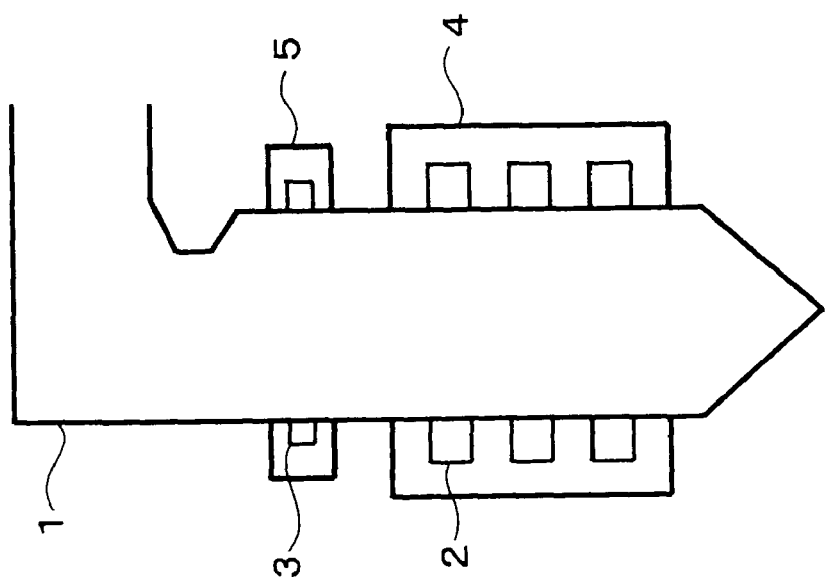
FIG. 20B is a schematic side elevational view of the combustion apparatus in FIG. 20A.
Figure 20A:
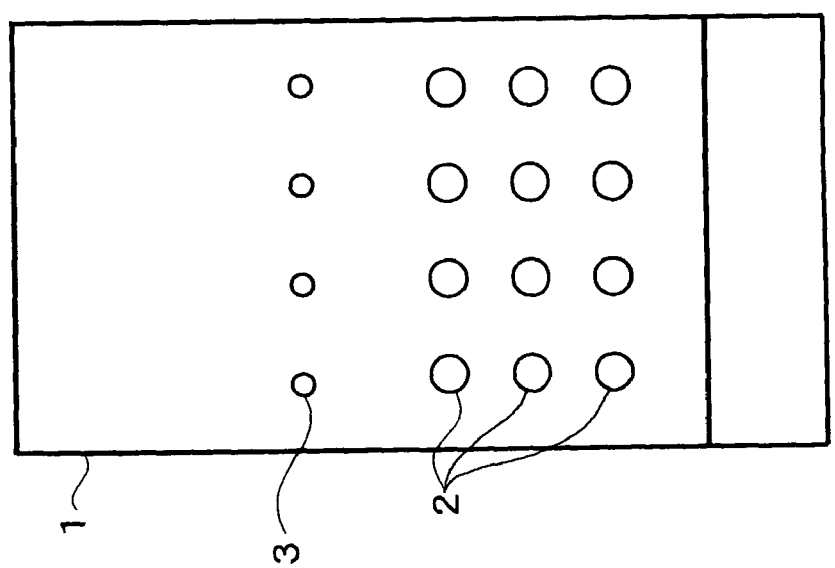
FIG. 20A is a schematic front elevational view showing a structure of a boiler combustion apparatus.
Figure 21:
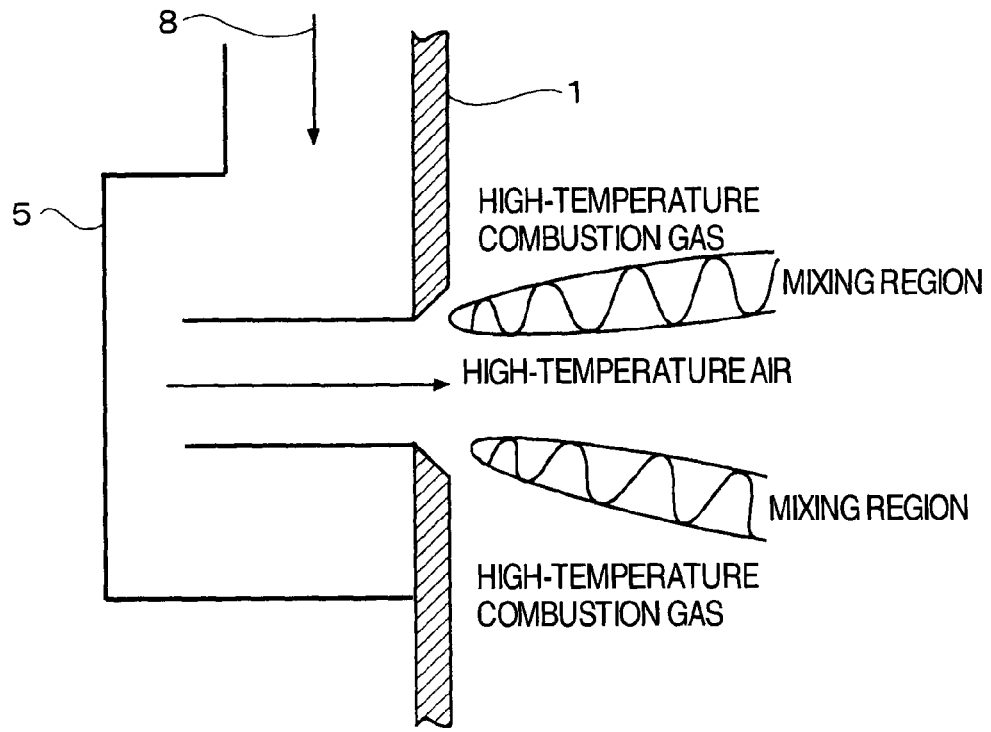
FIG. 21 is a schematic view of an outline structure of an AAP showing a first prior art.
Figure 22:
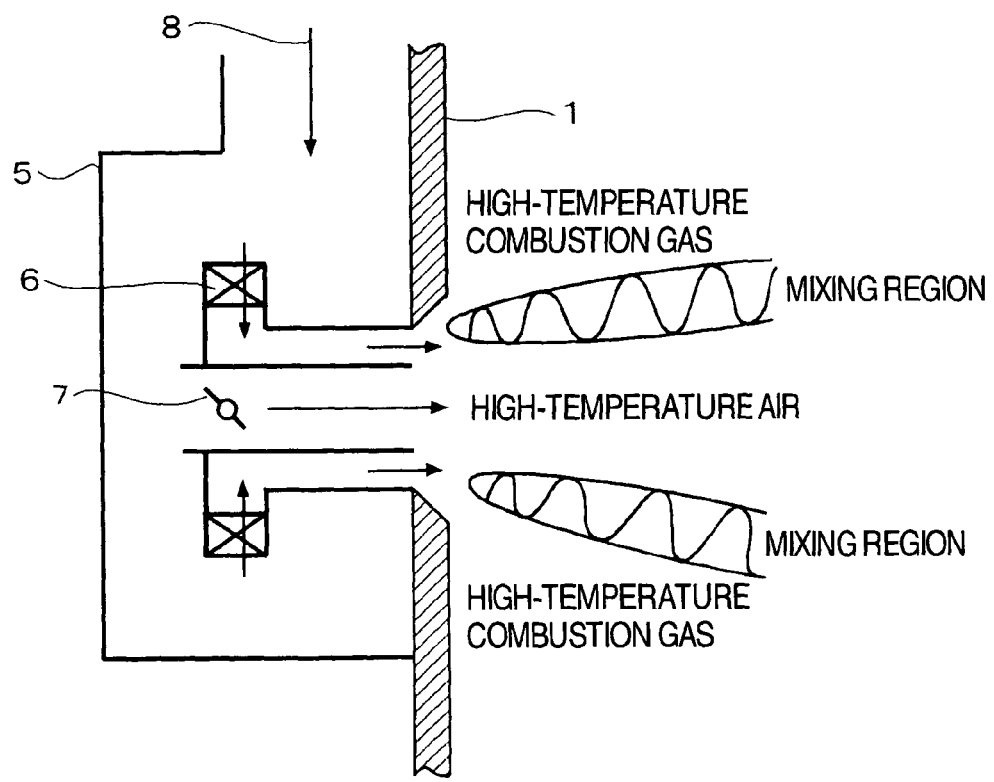
FIG. 22 is a schematic view of an outline structure of an AAP showing a second prior art.
Figure 23:
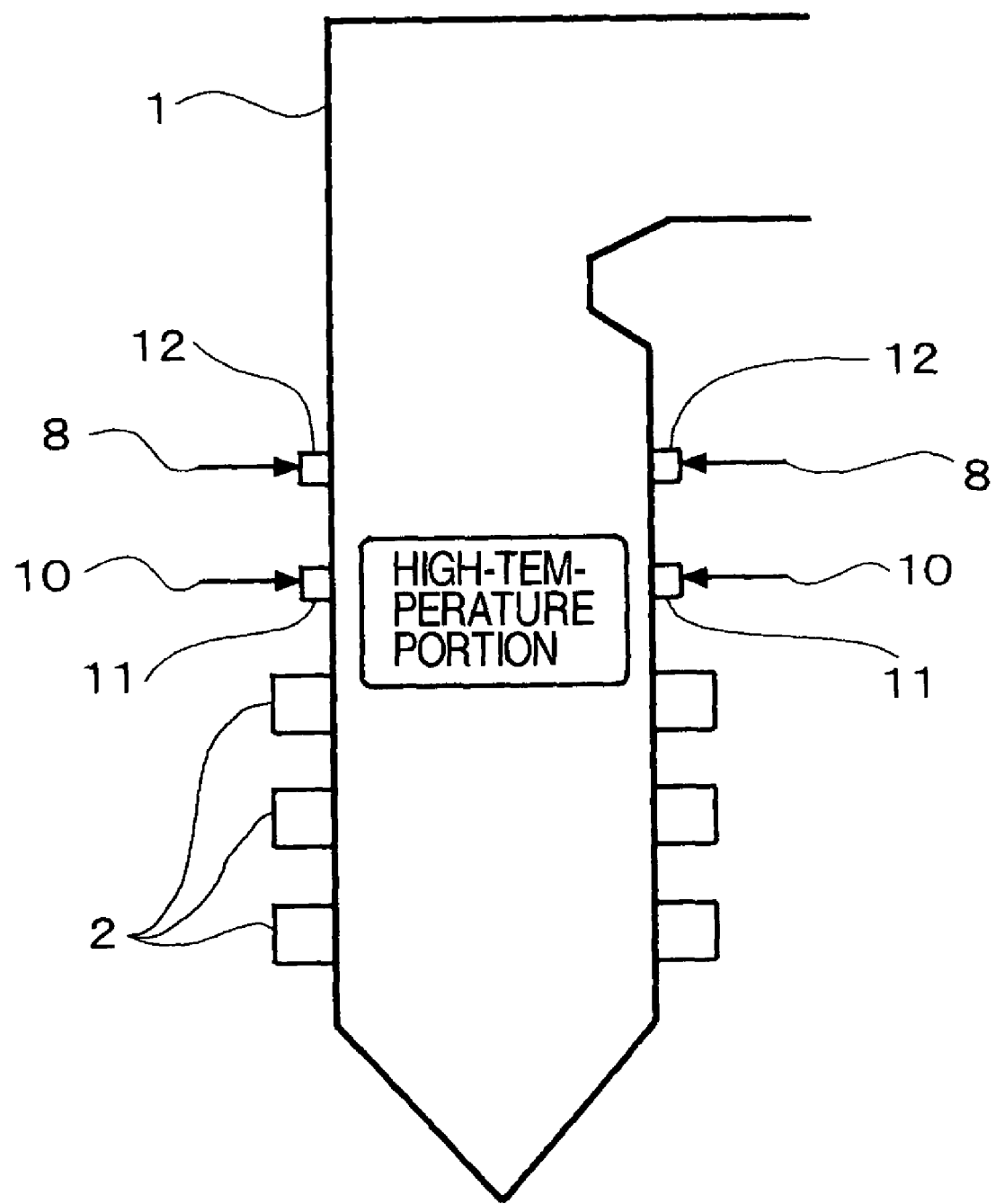
FIG. 23 is a schematic view of an outline structure of a combustion apparatus showing a third prior art.
Figure 24:
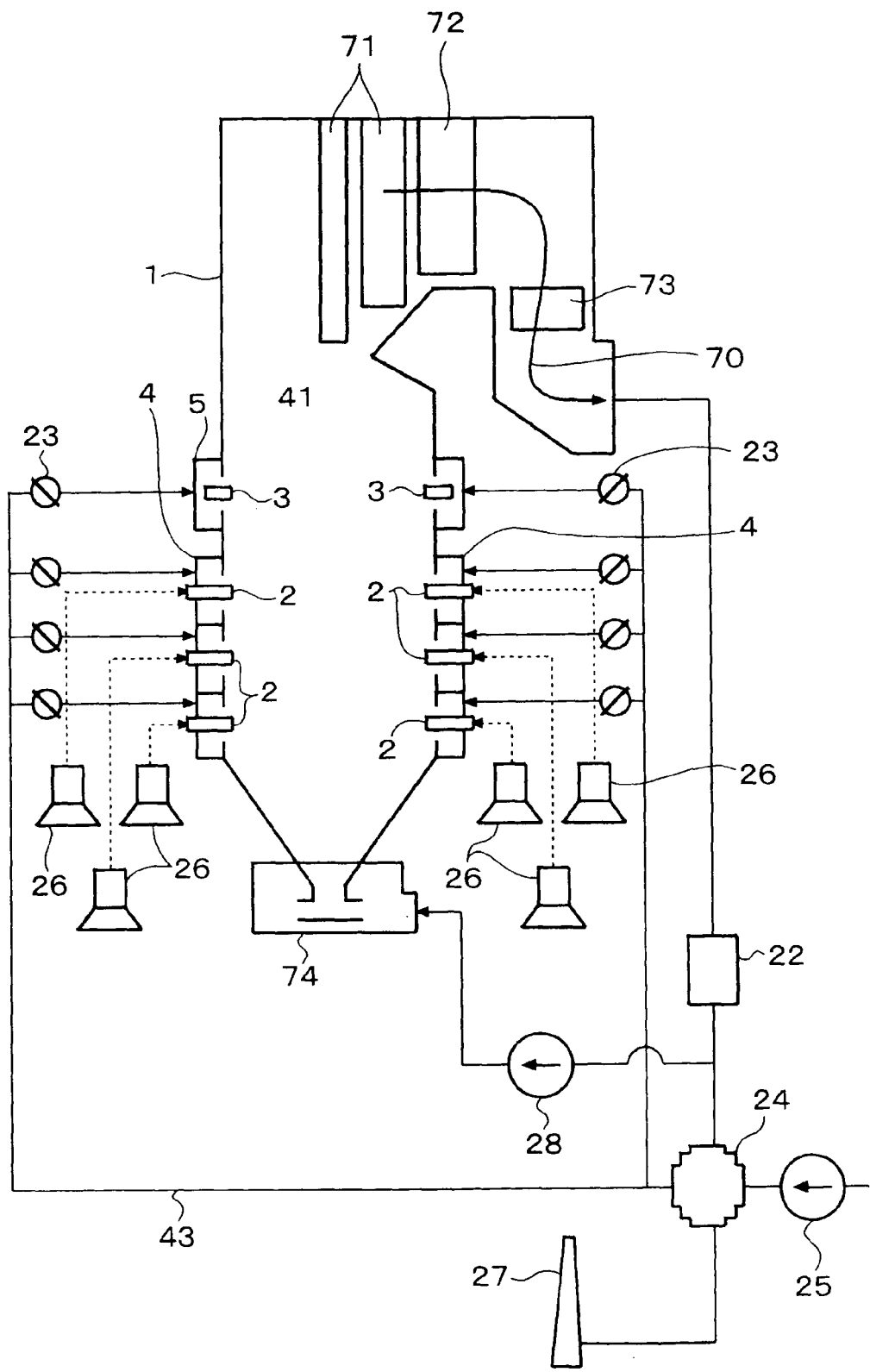
FIG. 24 is a schematic view of an outline structure of a combustion apparatus showing a fourth prior art.

The higher the boiler load is, the higher the gas temperature within the furnace becomes. As a result, the higher the boiler load is, the higher thermal NOx is. FIG. 19 is a view for explaining an example for setting the flow rate of the AAP recirculation gas, in which a horizontal axis shows the boiler load and a vertical axis shows the AAP exhaust gas recirculation ratio. In this case, the AAP exhaust gas recirculation ratio is a numeric value determined by the following expression.

AAP exhaust gas recirculation ratio=(AAP exhaust gas recirculation flow rate)/(combustion gas flow rate)×100(%)

In the present example, the AAP exhaust gas is supplied between the boiler load of 75 and 100% largely affected by the thermal NOx, the AAP exhaust gas recirculation ratio in the boiler load of 100% is set to about 3%, and the exhaust gas supply is stopped in the low load region (less than 75% in the present example). The reduction of combustion efficiency is inhibited by stopping the exhaust gas supply in the low load region having no problem in NOx.

In the case that the inhibiting gas such as the exhaust gas or the like is supplied to a plurality of air ports, it is preferable that a total supply flow rate of the inhibiting gas is variable as mentioned above in correspondence to the load of the combustion apparatus, and a total supply flow rate of the inhibiting gas is variable in correspondence to a nitrogen oxide discharge concentration of the combustion apparatus.

In some aspect of the fuel, there is a case that the NOx has no problem without the AAP exhaust gas supply. In such a case, an operation giving priority to a high efficiency is desirable, without supplying the AAP exhaust gas. In other words, an optimum operation can be achieved by making the total recirculation gas supply amount variable in correspondence to the NOx discharge concentration.

Figure 25:
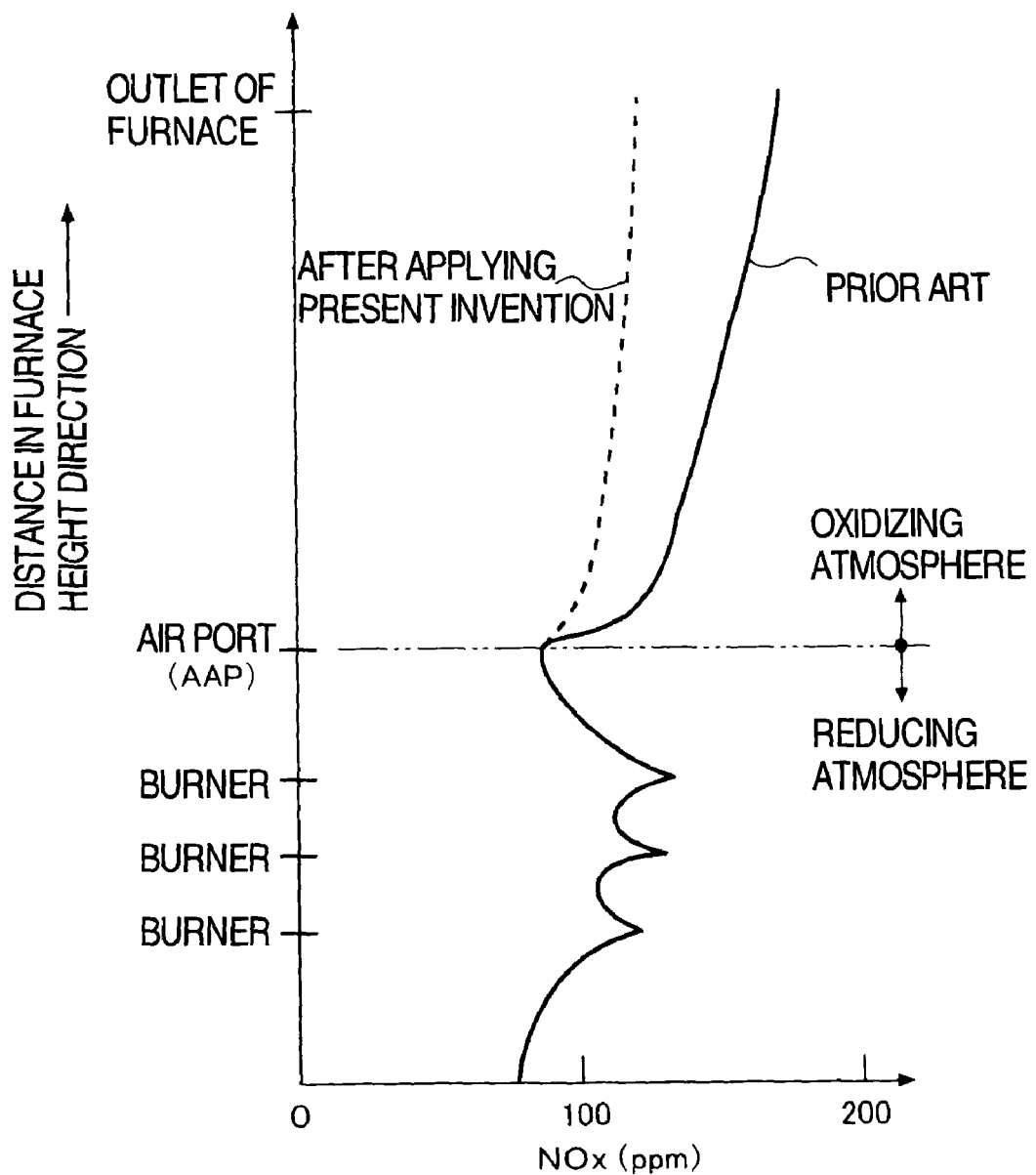
FIG. 25 is a view showing a distribution state within a furnace of an NOx concentration in the combustion apparatus.
Figure 26:
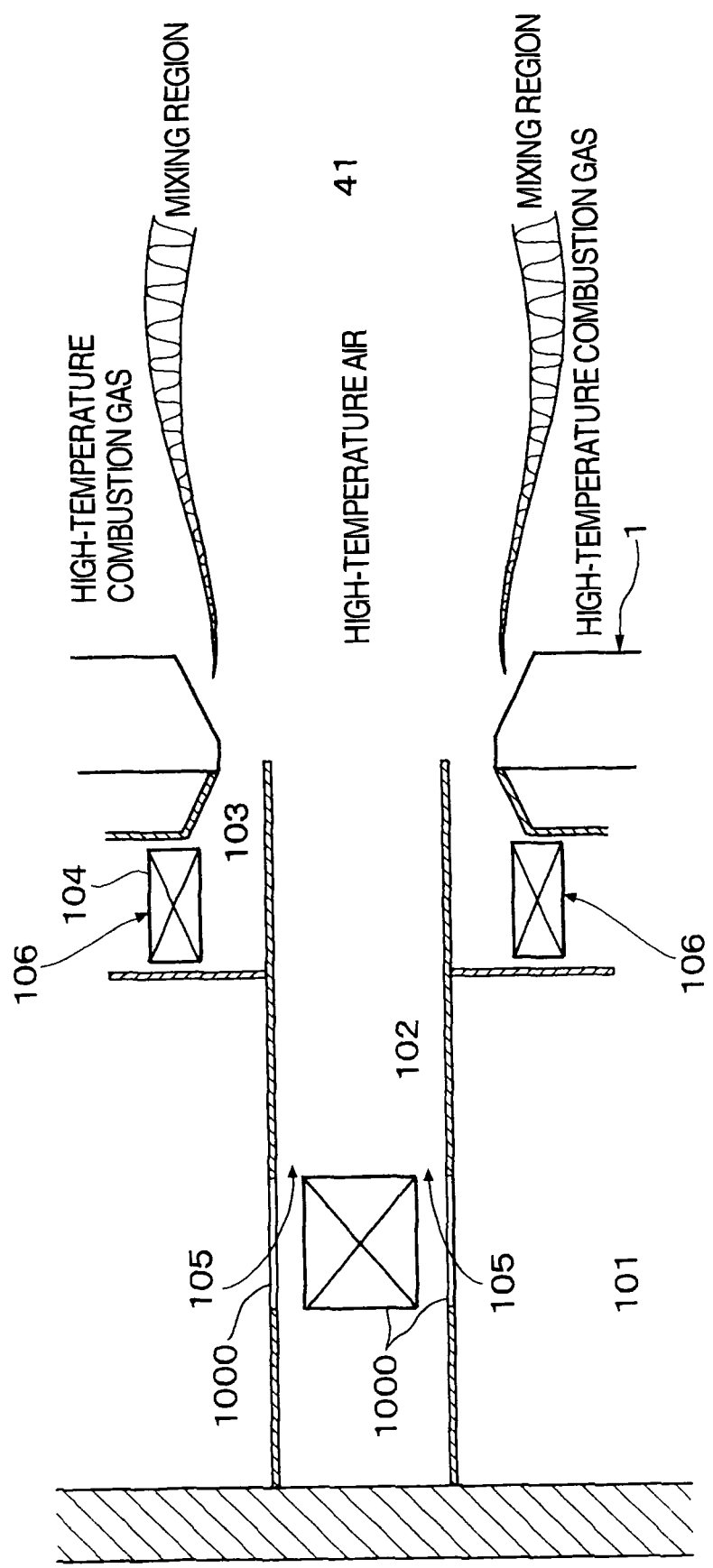
FIG. 26 is a view showing a conventional AAP structure, and a mixed state of an injection air from the AAP and a high-temperature combustion gas within the furnace.
Figure 27:
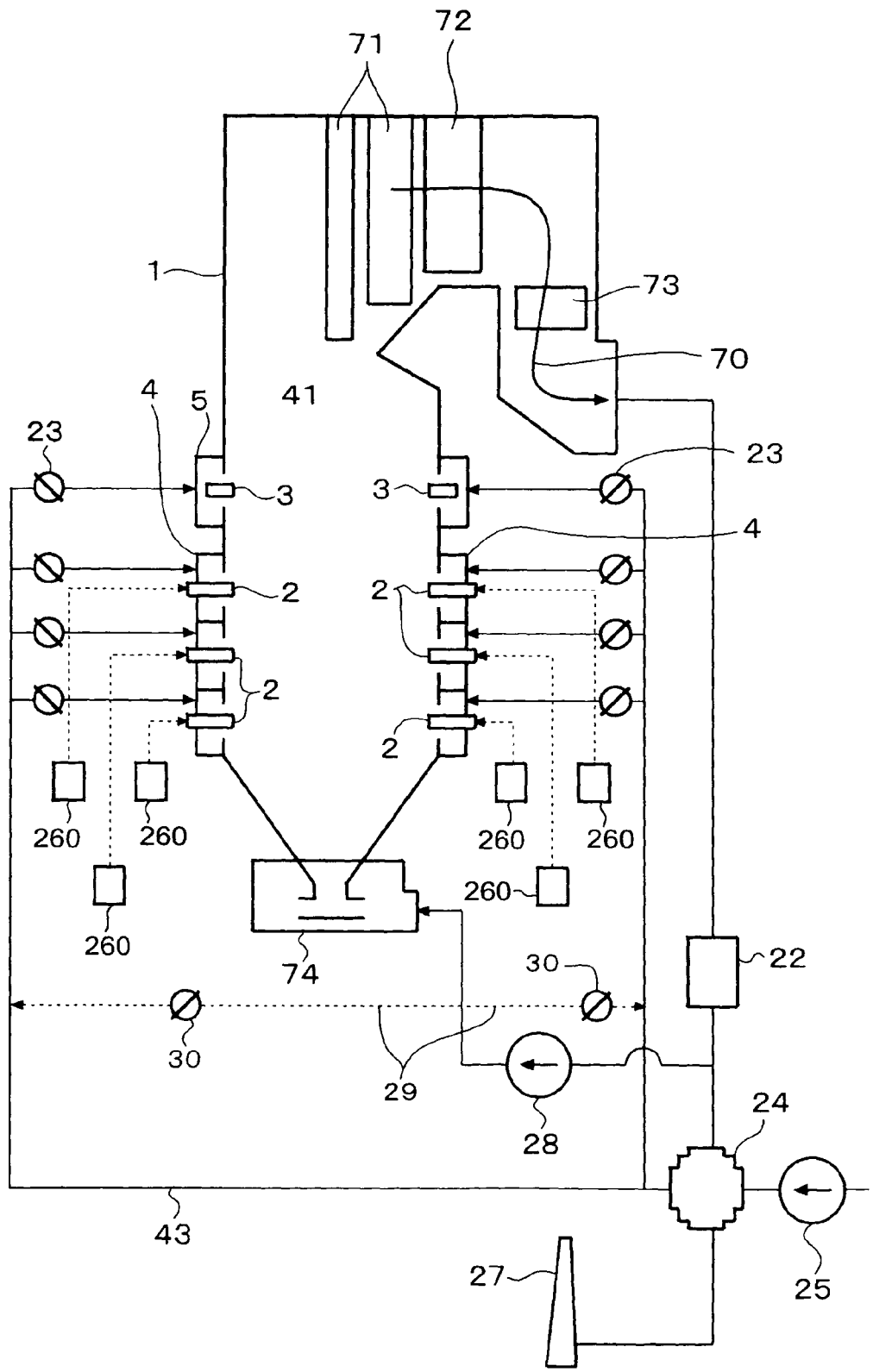
FIG. 27 is a schematic view of an outline structure of a combustion apparatus showing a fifth prior art.

In accordance with the means described in the first and seventeenth aspects, since the nitrogen oxide generation inhibiting gas is supplied only to the local high-temperature portion in the mixing region of the air port air and the high-temperature combustion gas controlling the thermal NOx, it is possible to effectively reduce the NOx generation concentration while inhibiting the entire temperature reduction within the furnace so as to maintain the combustion efficiency. An example of reducing the NOx in the case of employing the present invention is shown by a dotted line in FIG. 25. As is apparent from this result, it is possible to inhibit the NOx generation in a downstream side of the AAP changing to the oxidizing region, and it is finally possible to widely reduce the NOx in an outlet of the furnace.

In accordance with the means described in the second, eighteenth and nineteenth aspects, since the combustion air flow path and the inhibiting gas flow path are provided within the air port so as to be separated, it is possible to inhibit the structure from being enlarged.

In accordance with the means described in the third aspect, it is possible to employ various gases as the inhibiting gas.

In accordance with the means described in the fourth, fifth, sixth, twentieth, twenty first and twenty second aspects, it is possible to cover the entire of the outer peripheral portion of the air port air flow by the inhibiting gas flow, and the NOx reducing effect is great.

In accordance with the means described in the seventh, eighth, ninth, twenty third, twenty fourth and twenty fifth aspects, it is possible to obtain an improved NOx reducing effect by a small amount of inhibiting gas.

In accordance with the means described in the tenth aspect, it is possible to effectively utilize the exhaust gas as the inhibiting gas, and it is unnecessary to peculiarly prepare the inhibiting gas.

In accordance with the means described in the eleventh aspect, it is possible to easily set the optimum condition for the NOx generation inhibiting gas regardless of the condition of the exhaust gas recirculation used for controlling the steam temperature of the heat transfer device.

In accordance with the means described in the twelfth aspect, it is possible to obtain the thermal NOx reduction effect on the basis of the temperature reduction of the inhibiting gas.

In accordance with the means described in the thirteenth and fourteenth aspects, it is possible to effectively reduce the NOx within the furnace.

In accordance with the means described in the fifteenth aspect, it is possible to inhibit the combustion efficiency from being lowered by stopping the inhibiting gas supply in the low load region having no problem in NOx.

In accordance with the means described in the sixteenth aspect, it is possible to inhibit the combustion efficiency from being lowered by controlling the inhibiting gas supply in correspondence to the exhaust concentration of NOx.

INDUSTRIAL APPLICABILITY

The combustion apparatus in accordance with the present invention can inhibit the NOx generation even if the mixing between the high-temperature combustion gas and the air is promoted so as to reduce the unburned combustible.

The invention claimed is:

1. A combustion apparatus comprising:
a burner burning a fuel within a furnace in a theoretical air ratio or less;
a plurality of air ports arranged downstream of the burner and placed along a width direction of the furnace, each of said plurality of air ports being separated into an air injection port injecting additional combustion air into the furnace and an inhibiting gas injection port injecting a nitrogen oxide generation inhibiting gas constituted by at least one gas selected from the group consisting of combustion exhaust gas and a mixed gas of the combustion exhaust gas and air inhibiting a nitrogen oxide from being generated in a mixing region formed by both of a combustion gas generated by burning the fuel by means of said burner and the additional combustion air injected from said air port or near the mixing region, and including a flow rate regulator, wherein said inhibiting gas injection port is provided on an outer peripheral portion of said air injection port, at least a part of said outer peripheral portion being on a burner side of said air injection port, and wherein the flow rate regulators of the plurality of air ports are configured to provide more flow of the nitrogen oxide generation inhibiting gas to an air port close to the furnace center portion than to the air port close to the furnace side wall of the plurality of air ports; and
at least one blower for circulating combustion exhaust gas from an outlet of the furnace to an inlet of the flow path injecting a nitrogen oxide generation inhibiting gas, and for supplying the additional combustion air to the flow path injecting additional combustion air into the furnace.

2. A combustion apparatus as claimed in claim 1, wherein said inhibiting gas injection port is formed in an annular shape so as to surround the air injection port of each of said air ports.

3. A combustion apparatus as claimed in claim 1, wherein a plurality of said inhibiting gas injecting ports are arranged in a peripheral direction so as to surround the air injection port of each of said air ports.

4. A combustion apparatus as claimed in claim 1, wherein said inhibiting gas injection port is formed approximately in a circular arc shape so as to surround a part of the air injection port of each of said air ports.

5. A combustion apparatus as claimed in claim 1, wherein a plurality of said inhibiting gas injection ports are concentrically arranged in a part of an outer peripheral portion of the air injection port of each of said air ports.

6. A combustion apparatus as claimed in claim 1, further comprising a system for supplying a part of exhaust gas recirculation within said furnace as the nitrogen oxide generation inhibiting gas in a branched state.

7. A combustion apparatus as claimed in claim 6, wherein a blower exclusive for the nitrogen oxide generation inhibiting gas is placed in said system for supplying a part of exhaust gas recirculation.

8. A combustion apparatus as claimed in claim 6, wherein said nitrogen oxide generation inhibiting gas is constituted by an exhaust gas after a temperature thereof is lowered by a heat exchanger.

9. A combustion apparatus as claimed in claim 1, wherein a total supply flow rate of the nitrogen oxide generation inhibiting gas supplied to said plurality of air ports is variable in correspondence to a load of said combustion apparatus.

10. A combustion apparatus as claimed in claim 1, wherein a total supply flow rate of the nitrogen oxide generation inhibiting gas supplied to said plurality of air ports is variable in correspondence to a nitrogen oxide discharging concentration of said combustion apparatus.

* * * * *